United States Patent
Yoshikawa et al.

(10) Patent No.: US 12,223,396 B2
(45) Date of Patent: Feb. 11, 2025

(54) PROCESSING DATA FOR PREDICTING PIPE FAILURE

(71) Applicant: Fracta, Redwood City, CA (US)

(72) Inventors: Daichi Yoshikawa, Cupertino, CA (US); Matti Salomon Kakkori, Carlsbad, CA (US); Julio Daniel Buendia, San Francisco, CA (US)

(73) Assignee: Fracta, Redwood City, CA (US)

( * ) Notice: Subject to any disclaimer, the term of this patent is extended or adjusted under 35 U.S.C. 154(b) by 750 days.

(21) Appl. No.: 16/365,522

(22) Filed: Mar. 26, 2019

(65) Prior Publication Data

US 2019/0301963 A1     Oct. 3, 2019

Related U.S. Application Data

(60) Provisional application No. 62/743,483, filed on Oct. 9, 2018, provisional application No. 62/743,485, filed
(Continued)

(51) Int. Cl.
*G06Q 10/10* (2023.01)
*G01M 3/00* (2006.01)
(Continued)

(52) U.S. Cl.
CPC .............. *G06N 20/00* (2019.01); *G01M 3/00* (2013.01); *G06F 17/18* (2013.01); *G06F 30/00* (2020.01);
(Continued)

(58) Field of Classification Search
CPC ........ G06N 20/00; G06N 7/005; G06N 20/20; G06N 5/003; G01M 3/00; G06F 17/18;
(Continued)

(56) References Cited

U.S. PATENT DOCUMENTS

| 5,731,991 A | 3/1998 | Kinra |
| 6,556,924 B1 | 4/2003 | Kariyawasam |

(Continued)

FOREIGN PATENT DOCUMENTS

| CA | 3094695 | 10/2019 |
| CA | 3094707 | 10/2019 |

(Continued)

OTHER PUBLICATIONS

U.S. Department of Transportation "Work Zone Road User Costs" DOT; White Paper [online]. Dec. 2011 [retrieved Dec. 6, 2019]. Retrieved from the Internet: <URL: https://ops.fhwa.dot.gov/wz/resources/publications/fhwahop 12005/fhwahop 12005.pdf>.
(Continued)

*Primary Examiner* — Jonathan P Ouellette
(74) *Attorney, Agent, or Firm* — Wissing Miller LLP

(57) ABSTRACT

A system receives and automatically transforms utility pipe attribute data and pipe break data. The missing and/or incorrect entries in the pipe attributes and/or break data is automatically identified and correct values for these entries are is automatically imputed to generate improved datasets of the pipe attribute data and break data. The improved data can be used to build a model with machine learning. Predictions of future likelihood of failure for pipe sections in a network of pipes can be made based on the model. A national database can be created that is filled with environmental data that has been transformed, optimized, merged, and imputed. The national database can be used for many customers to save computational costs. The national database can be used to build the failure prediction model for utility companies thereby saving computational costs.

20 Claims, 21 Drawing Sheets

Related U.S. Application Data on Oct. 9, 2018, provisional application No. 62/743,477, filed on Oct. 9, 2018, provisional application No. 62/671,601, filed on May 15, 2018, provisional application No. 62/658,189, filed on Apr. 16, 2018, provisional application No. 62/649,058, filed on Mar. 28, 2018.

(51) Int. Cl.

| | | |
|---|---|---|
| *G06F 17/18* | (2006.01) | |
| *G06F 30/00* | (2020.01) | |
| *G06N 7/01* | (2023.01) | |
| *G06N 20/00* | (2019.01) | |
| *G06N 20/20* | (2019.01) | |
| *G06Q 10/06* | (2023.01) | |
| *G06Q 10/0631* | (2023.01) | |
| *G06Q 30/02* | (2023.01) | |
| *G06Q 30/06* | (2023.01) | |
| *G06F 16/787* | (2019.01) | |
| *G06F 113/14* | (2020.01) | |
| *G06Q 10/00* | (2023.01) | |
| *G06Q 10/087* | (2023.01) | |
| *G06Q 30/012* | (2023.01) | |

(52) U.S. Cl.
CPC .............. *G06N 7/01* (2023.01); *G06N 20/20* (2019.01); *G06Q 10/0631* (2013.01); *G06F 16/787* (2019.01); *G06F 2113/14* (2020.01); *G06Q 10/00* (2013.01); *G06Q 10/087* (2013.01); *G06Q 30/012* (2013.01)

(58) Field of Classification Search
CPC .... G06F 30/00; G06F 16/787; G06F 2113/14; G06Q 10/0631; G06Q 10/00; G06Q 10/087; G06Q 30/012; G06Q 10/06311; G06Q 10/04; G06Q 50/06
USPC .................................................. 705/1.1–912
See application file for complete search history.

(56) References Cited

U.S. PATENT DOCUMENTS

| | | | |
|---|---|---|---|
| 6,862,540 B1 | 3/2005 | Welch | |
| 7,263,465 B2 * | 8/2007 | Turley | F17D 5/00 702/182 |
| 7,920,983 B1 * | 4/2011 | Peleg | G06Q 10/06 702/50 |
| 8,443,013 B1 † | 5/2013 | Lin | |
| 8,583,386 B2 * | 11/2013 | Armon | G05B 23/024 702/179 |
| 9,393,262 B2 | 7/2016 | Kumar | |
| 9,395,262 B1 | 7/2016 | Kumar | |
| 2007/0083398 A1 | 4/2007 | Ivey | |
| 2011/0007076 A1 * | 1/2011 | Nielsen | G06F 3/0482 345/441 |
| 2011/0137704 A1 | 6/2011 | Mitra | |
| 2012/0059684 A1 | 3/2012 | Hampapur | |
| 2012/0209653 A1 | 8/2012 | Andoji | |
| 2013/0138396 A1 | 5/2013 | Hauffen | |
| 2013/0211797 A1 † | 8/2013 | Scolnicov | |
| 2014/0052421 A1 | 2/2014 | Allen | |
| 2014/0110167 A1 | 4/2014 | Goebel | |
| 2014/0163916 A1 † | 6/2014 | Ba | |
| 2015/0248737 A1 | 9/2015 | Forbes | |
| 2016/0103433 A1 | 4/2016 | Sahni | |
| 2017/0076563 A1 | 3/2017 | Guerriero | |
| 2018/0300639 A1 * | 10/2018 | Abbas | G06N 20/00 |

FOREIGN PATENT DOCUMENTS

| | | |
|---|---|---|
| CN | 201229289 | 4/2009 |
| CN | 104281921 | 1/2015 |
| CN | 105069694 | 11/2015 |
| CN | 106022518 | 10/2016 |
| CN | 107480705 | 9/2020 |
| GB | 2562976 | 11/2018 |
| JP | 2006183274 | 7/2006 |
| JP | 2010108307 | 5/2010 |
| JP | 2012108836 | 6/2012 |
| JP | 2014145603 | 8/2014 |
| JP | 2014182609 | 9/2014 |
| JP | 2016033808 | 3/2016 |
| JP | 2015094665 | 5/2016 |
| JP | 2021519433 | 8/2021 |
| WO | 2015129031 | 9/2015 |
| WO | 2017154761 | 1/2019 |
| WO | 20200077000 | 4/2020 |
| WO | 20200077005 | 4/2020 |

OTHER PUBLICATIONS

Service Line Warranties of America "Average Cost of a Service Line Repair or Replacement" Blog [online]. Jun. 16, 2014 [retrieved Dec. 6, 2019]. Retrieved from the Internet: <URL: https://slwablog.com/2014/06/16/average-cost-of-a-service-line-repair-or-replacement/>.
Balkan, D "Calculating the Correct Water Supply Line Size for Your Home or Property" 1-20 Article [online]. Sep. 22, 2014 [retrieved Dec. 6, 2019]. Retrieved from the Internet: <URL: http://www.balkanplumbing.com/required-main-water-supply-line-size/>.
Japanese Office Action in Pat. Appln. No. 2020-552731, dated Mar. 15, 2023.
Research for Establishment of Prediction of Pipeline Damage by Earthquake by Water Service Technology Center.
Written Submission of Publications.
Japanese Office Action in Pat. Appln. No. 2020-552819, dated Dec. 25, 2023.
European Examination Report for Application No. 19777854.1, dated Nov. 10, 2023.
European Examination Report for Application No. 19776418.6, dated Dec. 21, 2021.
European Examination Report for Application No. 19871328.1, dated May 11, 2022.
European Examination Report for Application No. 19871106.1, dated May 9, 2022.
Sophie Duchesne, A Survival Analysis Model for Sewer Pipe Structural Deterioration, Computer-Aided Civil and Infrastructure Engineering 28 (2013) pp. 146-160.
El Housni Hind, Identification of most significant factors for modeling deterioration of sewer pipes, Canadian Journal of Civil Engineering, Oct. 5, 2027, 42 pages.
Canadian Office Action for Application No. 3,094,695, dated Dec. 4, 2023.
Canadian Office Action for Application No. 3,094,707, dated May 30, 2022.

\* cited by examiner
† cited by third party

| Material | Installation Year Range |
|---|---|
| CI | 1700-1970 |
| AC | 1950-1970 |
| DI | 1970-Present |
| PLAS | 1970-Present |
| ST | 1960-Present |
| CON | 1900-Present |

Standard Material Install Year Ranges

Missing Material Data

| Pipe ID | Installation Year | Material |
|---|---|---|
| 1 | 1924 | |
| 2 | 1937 | |
| 3 | 1956 | |
| 4 | 1967 | |
| 5 | 1986 | |
| 6 | 2004 | |

+

AWWA Material Information

↑ Data Cleaning

Filled Material Data

| Pipe ID | Installation Year | Material |
|---|---|---|
| 1 | 1924 | CI |
| 2 | 1937 | CI |
| 3 | 1956 | CI |
| 4 | 1967 | DI |
| 5 | 1986 | DI |
| 6 | 2004 | PLAS |

ACME's Raw Pipe Data

| Pipe ID | Material | Diameter |
|---|---|---|
| 1 | CIP | 6 |
| 2 | CIP | 8 |
| 3 | | |
| 4 | | 6 |
| 5 | HDPE | 4 |
| 6 | DIP | 8 |

1010

ACME's Raw Break Data

| Break ID | Break Date | Address |
|---|---|---|
| 1 | 01/07/2017 | 123 Main street, Townsville, CA |
| 2 | 03/12/2017 | 331 Pine Avenue, Townsville, CA |
| 3 | 06/26/2017 | 536 Broadway, Silver Lake, CA |
| 4 | 10/14/2017 | 417 Hope Way, Silver Lake, CA |
| 5 | 01/07/2018 | 267 Page Avenue, Townsville, CA |
| 6 | 03/01/2018 | 189 Hill street, Townsville, CA |

1012

ACME's Provided Information

| Material | Acronym |
|---|---|
| Cast Iron | CIP |
| Ductile Iron | DIP |
| Plastic | HDPE |

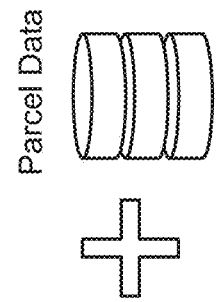
FIG. 11

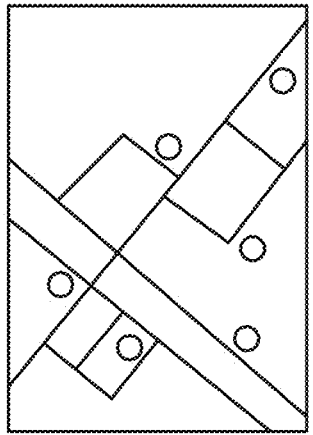
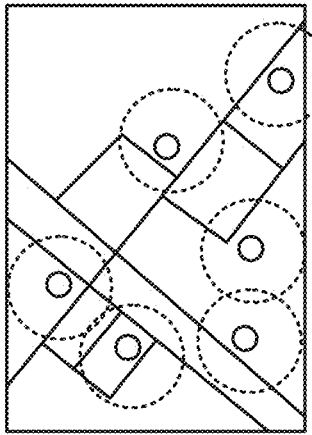
FIG. 12

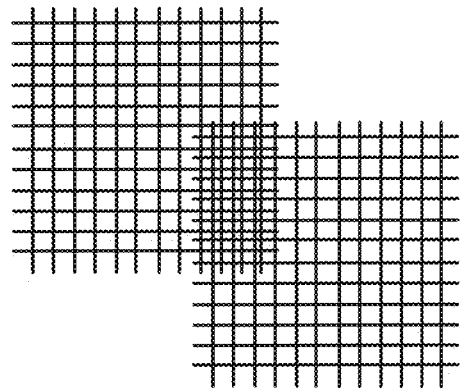
Overlapping Raster Data
FIG. 13A
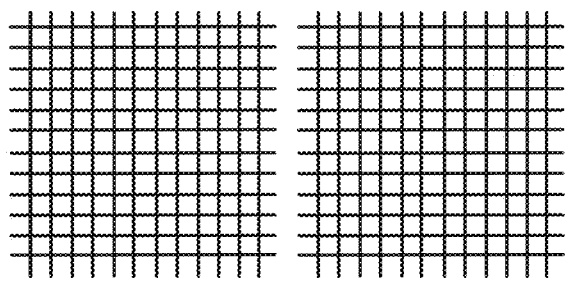
Raster Data Gap
FIG. 13B
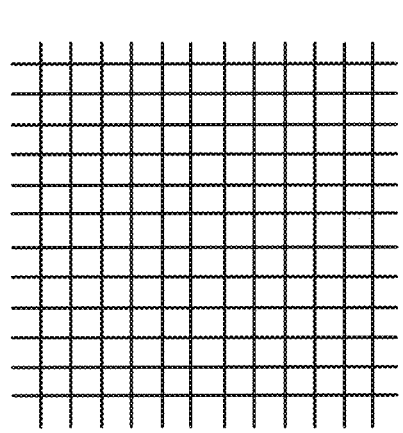 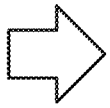 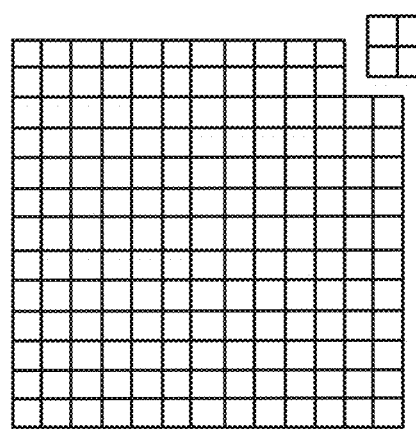
Rater Pixel Data
(each square is a pixel)
Veceorized Data
(each square is a polygon)
FIG. 15

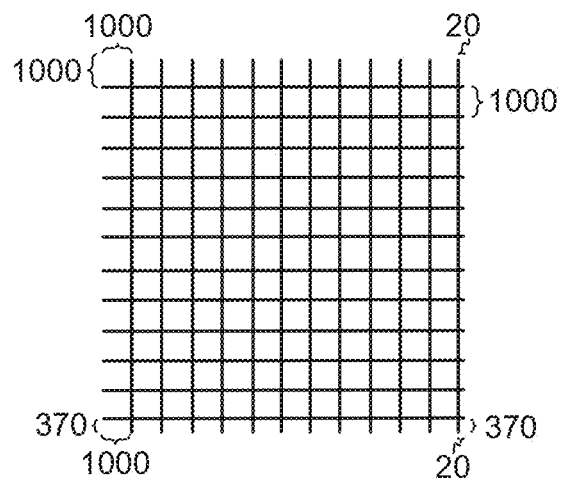
FIG. 16
+
+
+
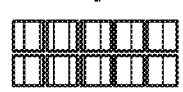
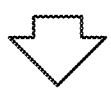
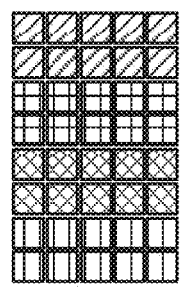
FIG. 17

| $x_1$ | $x_2$ | $x_3$ |
|---|---|---|
| $y_1$ | $y_2$ | $y_3$ |
| $z_1$ | $z_2$ | $z_3$ |

PROCESSING DATA FOR PREDICTING PIPE FAILURE

REFERENCE TO RELATED APPLICATIONS

This patent application claims the benefit of and incorporates by reference each of the following provisional applications:
U.S. Prov. Ser. No. 62/649,058 filed Mar. 28, 2018;
U.S. Prov. Ser. No. 62/658,189 filed Apr. 16, 2018;
U.S. Prov. Ser. No. 62/671,601 filed May 15, 2018;
U.S. Prov. Ser. No. 62/743,477 filed Oct. 9, 2018;
U.S. Prov. Ser. No. 62/743,483 filed Oct. 9, 2018; and
U.S. Prov. Ser. No. 62/743,485 filed Oct. 9, 2018.

This patent application is related to and incorporates by reference the following US and PCT applications filed on even date herewith: U.S. patent application Ser. No. 16/365,466; Int'l Pat. Appl. No. PCT/US19/24139, filed Mar. 26, 2019; and Int'l Pat. Appl. No. PCT/US19/24141, filed Mar. 26, 2019, which are referred to collectively as the "Patent Applications".

FIELD

This patent specification generally relates to improved systems and methods for processing data pertaining to networks of underground pipes. More particularly, some embodiments relate to methods and systems for improving pipe data relating to networks of underground pipes for carrying a fluid to consumers. Some embodiments relate to methods and systems for creating a standardized database containing environmental data that can relate to networks of underground pipes.

BACKGROUND

Water Utility companies in the United States have accumulated millions of data points on their systems, collecting information on their pipe network as well as recording breaks as they occur over time. This data is useful for these utility companies, from understanding the age and makeup of their system to planning pipe replacements and tackling breaks.

Unfortunately, the roughly 50,000 water utility companies that service the United States have not consolidated their data, and much of the data is stored in varying formats. Because of this, these utilities are limited in their ability to merge their data with other forms of information and are often unable to perform accurate analyses of their systems.

In addition, most utilities have not maintained the quality of their data sets. Some utilities have data which contains errors and can affect the accuracy of their analysis. For example, certain utilities have not geolocated the locations of previous pipe breaks or even identified which pipes have previously broken. These issues severely limit the accuracy of analyses on utility data as well as the effectiveness of the utility's work.

Furthermore, various organizations in the United States have collected millions of data points related to environmental and geospatial attributes such as soil properties, population, climate, and more. These data sets are valuable for use in geospatial analyses and correlating the relationship between these variables and other features. For example, these datasets would be immensely useful in the calculation of the likelihood of failure of water mains across the country. Unfortunately, however, these datasets are unusable in their raw form.

SUMMARY

According to some embodiments, a method is described for improving pipe data relating to networks of underground pipes for carrying a fluid to consumers. According to some embodiments, the pipes can be used for carrying other types of fluid such as: waste water, recycled water, brackish water, storm water, sea water, drinking water, steam, compressed air, oil and natural gas. The method includes: receiving a set of pipe data that includes a plurality of pipe attributes for one or more of said networks of underground pipes; identifying one or more pipes in at least on of said networks for which one or more pipe attributes is missing or incorrect; automatically generating imputed data for the one or more pipe attributes resulting in an improved set of pipe data; and managing one or more aspects of one or more of said networks of underground pipes based on the improved set of pipe data.

According to some embodiments, the imputed data is automatically generated based on a geolocation transfer process that uses one or more sources such as GPS, address, and/or geocode. The set of pipe data can include pipe break data with locations for pipe breaks but not specific pipe sections for the breaks. The geolocation transfer process can assign pipe sections to at least some of said pipe breaks that are not the closest pipe sections to the respective locations for the pipe breaks. According to some embodiments, the imputed data can include using parcel data for relating geographic positions to some of the pipe sections.

According to some embodiments, examples of the missing or incorrect pipe attribute data that is automatically imputed includes: the year of installation, pipe material and pipe diameter. According to some embodiments, the likelihood of failure of one or more pipe sections can be predicted based on the improved set of pipe data. The predicting can be based on a model built with machine learning using the improved set of pipe data.

According to some embodiments, a system is described for improving pipe data relating to networks of underground pipes for carrying fluid to consumers. The system includes: a database that stores a set of pipe data that includes a plurality of pipe attributes for one or more of said networks of underground pipes; and a processing system configured to identify one or more pipes in at least on of said networks for which one or more pipe attributes is missing or incorrect, generate imputed data for the one or more pipe attributes resulting in an improved set of pipe data, wherein one or more of aspects of one or more of said networks of underground pipes can be managed based at least in part on the improved set of pipe data. According to some embodiments, the system can also comprise a front end system that includes an uploader for receiving said set of pipe data from a customer who manages the one or more aspects of at least one of said networks of underground pipes, and a viewer that can display at least some of said improved set of pipe data which facilitates said management. According to some embodiments the processing system is further configured to predict likelihood of pipe segments in the said networks leaking, and said one or more of aspects of one or more of said networks of underground pipes being managed includes replacing pipe sections based at least in part on said predicted likelihood of leaking.

According to some embodiments, a method is described for creating a standardized database containing environmental data. The method can include: accessing a first plurality of separate environmental raster form datasets; merging at least some of the first plurality of separate environmental raster form datasets to generate a second plurality of larger environmental form datasets; vectorizing at least some of second plurality of larger environmental form datasets to generate a third plurality of larger vector datasets; merging at least some of the third plurality of larger vector datasets to form a merged vector dataset; and imputing one or more missing attributes in the merged vector dataset to generate a standardized database. The raster data being merged in some cases are not overlapping and/or are not coextensive with each other.

According to some embodiments, outlier data is removed from said standardized database based on falling outside one or more predetermined limits. The standardized database can include one or more new environmental variables such as soil density, population density and national slope, that were not included in the original environmental raster data. According to some embodiments, zoning data an be re-categorized.

The standardized database can be used by a plurality of customers to provide computational cost savings to each of said customers compared to using a custom generated database. According to some embodiments, the standardized database is used to predicting likelihood of pipe segments leaking in a network of underground pipes for carrying fluid to consumers. The prediction can be made using a model that is built with machine learning based on the standardized database.

As used herein, the grammatical conjunctions "and", "or" and "and/or" are all intended to indicate that one or more of the cases, object or subjects they connect may occur or be present. In this way, as used herein the term "or" in all cases indicates an "inclusive or" meaning rather than an "exclusive or" meaning.

BRIEF DESCRIPTION OF THE DRAWINGS

To further clarify the above and other advantages and features of the subject matter of this patent specification, specific examples of embodiments thereof are illustrated in the appended drawings. It should be appreciated that elements or components illustrated in one figure can be used in place of comparable or similar elements or components illustrated in another, and that these drawings depict only illustrative embodiments and are therefore not to be considered limiting of the scope of this patent specification or the appended claims. The subject matter hereof will be described and explained with additional specificity and detail through the use of the accompanying drawings in which:

FIG. 10 is a diagram showing data received from an example case customer;

FIG. 11 is a diagram illustrating a process for cleaning pipe data for an example case customer;

FIG. 12 is a diagram illustrating a process for cleaning break data for an example case customer;

FIGS. 13A and 13B are diagrams illustrating possible issues with raster data;

FIG. 15 is a diagram illustrating vectorizing raster data, according to some embodiments. In order to use the national data for analysis, vector data can be used;

FIG. 16 is a diagram illustrating splitting raster data in preparation for vectorization, according to some embodiments;

FIG. 17 is a diagram illustrating concatenating CSVs vertically, according to some embodiments;

DETAILED DESCRIPTION

Figure 1:
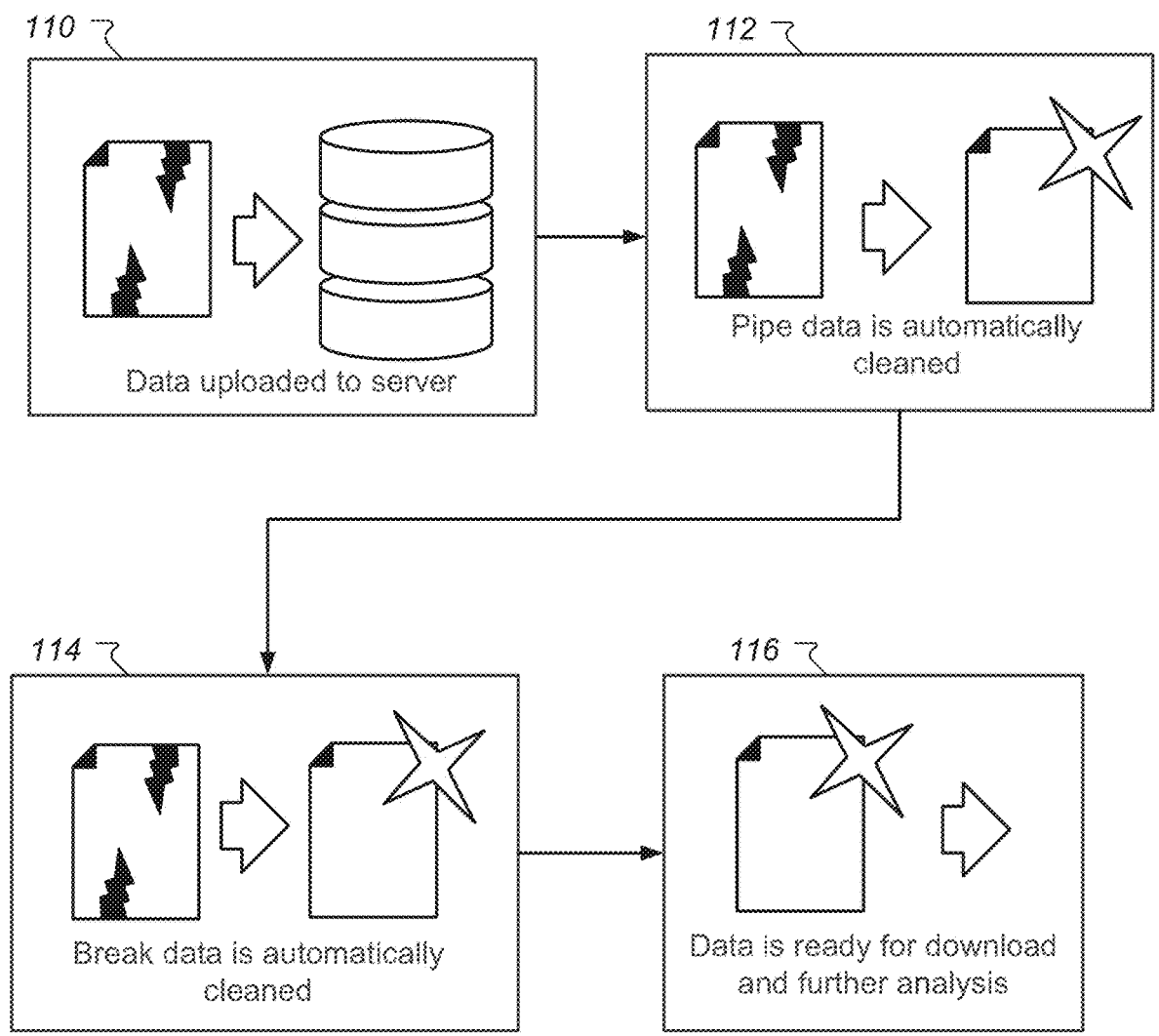
FIG. 1 is a block diagram illustrating aspects of data cleaning for a water utility company, according to some embodiments.

A detailed description of examples of preferred embodiments is provided below. While several embodiments are described, it should be understood that the new subject matter described in this patent specification is not limited to any one embodiment or combination of embodiments described herein, but instead encompasses numerous alternatives, modifications, and equivalents. In addition, while numerous specific details are set forth in the following description in order to provide a thorough understanding, some embodiments can be practiced without some or all of these details. Moreover, for the purpose of clarity, certain technical material that is known in the related art has not been described in detail in order to avoid unnecessarily obscuring the new subject matter described herein. It should be clear that individual features of one or several of the specific embodiments described herein can be used in combination with features of other described embodiments or with other features. Further, like reference numbers and designations in the various drawings indicate like elements.

According to some embodiments, a standardized process is described for receiving and transforming utility pipe and break information. In order to achieve this, an automated approach provides for data processing based on research in statistical methods, as well as relevant water industry practices. Various systems and methods described herein according to some embodiments result in a number of improvements over the use of conventional techniques. It has been found that various systems and methods described herein result in substantial improvements in quality of data pertaining to networks of underground pipes. For example, aspects of the current disclosure can result in one or more of the following improvements over conventional techniques: reducing error in datasets by using a standardized and programmatic procedure; imputing missing data based on statistical methods as well as historical water industry data; identifying and correcting errors in both pipe and break data; and providing geolocation of break data for map display and the identifying pipes in which breaks occurred.

According to some embodiments, a system is described for prioritizing the replacement of underground pipes. The system includes: a database that stores information, including pipe data, pipe break data, and external data including geographically specific data; a memory that stores at least one program having program instructions; a network interface coupled to at least one computer; and a processor, coupled to the database, the network interface and the memory. The processor is capable of executing the program instructions of the at least one program to cause the processor to: receive a set of pipe data that includes a plurality of pipe attributes; from the plurality of pipes, identify one or more pipes for which one or more pipe attributes are missing or incorrect; access parcel data relating to a geographic location that corresponds to the one or more pipes; generate imputed data for the one or more pipe attributes based on the parcel data; and transmit cleaned pipe data that includes the imputed data.

According to some further embodiments, the processor is also configured to receive break data; access geographic data relating to the break data; generate geolocation data for the received break data based on the accessed geographic information; and predict future likelihood of failure for at least a subset of the plurality of pipes based, at least in part, on at least one of the imputed data and geolocation data.

According to some other embodiments, the break data includes a street address associated with an occurrence of a pipe break and the geographic data comprises a geographic location associated with the street address. In addition, the processor may be further configured to identify a particular pipe, from the plurality of pipes, associated with the street address and may generate the geolocation data by associating the break data with the particular pipe.

According to some other embodiments, the processor may be further configured to automatically reformat the received pipe data and break data. Reformatting may include converting pipe attributes to standardized acronyms or to standardized forms of numerical values. The parcel data can include one or more dates of construction for one or more structures associated with the geographic location that corresponds to the one or more pipes, and the one or more attributes comprise a date of pipe instillation. The pipe attributes can include at least one of a pipe ID, pipe material, and pipe size.

According to some other embodiments, the processor is further configured to generate imputed data for a first pipe attribute based on a second pipe attribute, wherein the first and second pipe attributes are associated with the same pipe or are associated with pipes having one or more similar attributes. The processor may be further configured to determine pipes that are similar to the one or more pipes for which one or more attributes are missing or incorrect and wherein the imputed data is based, at least in part, on attributes of the pipes that are similar to the one or more pipes. The processor may be further configured to provide for display a visible indication of pipe attributes that are determined to be missing or incorrect, and to provide for display a visible indication of data entries that contain imputed data.

According to some embodiments a national database can be created that is filled with environmental data that has been transformed, optimized, merged, and imputed. A programmatic approach using geoprocessing is described. It has been found that various systems and methods described herein result in substantial improvements. It has been found that the creation of a standardized database, as described herein, containing national data is useful for many types of analyses. Improvements resulting from such databases include one or more of the following: substantially increased computational efficiency and reduced running times for applications; substantial reduction of real-time software crashes by processing data in advance; and an ability to include and use data from a wider range of sources.

As used herein the following terms have the following meanings: "wrangling"—process of data cleaning; "utility data"—fata provided by water utility companies (utilities), categories of utility data may include pipe data and break data; "pipe data"—geographic pipe data, which may include information on installation year, material, diameter, etc; "break data"/"break history"—break record of pipes which may include location relevant pipe IDs, and date information; "parcel data"—data which contains information about a particular plots of land, including when buildings or other structures on the plots of land were constructed; "shapefile"—a type of file format that may include a directory containing geographic information, including shape information along with supplemental information (such as projection or column attributes); "geocoding"—the process of associating a particular object or occurrence with one or more geographic locations, such as points of latitude and longitude; "raster data"—geospatial information that is stored as pixel data/pixel array and includes pixel resolution and at least one point of geographical location (e.g raster data can be overlaid on a geographical map), examples include tif and geotiff; "vector data"—geospatial information that includes geometry and attributes in a table format, examples include shp, gpkg, and geojson; "geodatabase"—a relational database that is able to handle geographical information; eg. Data can be selected based on location; "WKT geometry"—geometry information in format of Well-Known-Text, examples include LINESTRING (30 10, 10 30, 40 40); "CRS"—Coordinate Reference System, also known as SRS (spatial reference system) is used to locate geographical entities and is made up of three components: a coordinate system, a datum, and a projection. One of the most common datums used is the World Geodetic System, last revised in 1984 (WGS84) which is used for applications such as GPS; "line data"—geographical line data includes roads (primary roads, motorway, etc.), rails (regular railway, light railway, subway, tram, etc.), linear water (river, stream, canal, drain, etc.), shoreline, and more; "point data"—geographical point data includes rail stations (railway stations, railway halts, tram stops, etc.), bus stops (bus stop, bus station, etc.); and "public data"—data which is publicly available and/or available through governmental sources, e.g. soil data, climate data, etc. Note that the use of term "public" when used in "public data" does not necessarily mean than the data is generally available to the public free of charge. Rather it means that the data is available from a pooled resource such as a governmental agency (e.g. USGS soil data).

When it comes to the data storage and data processing of pipe and break data, the methods that US Water Utilities use are both inconsistent and inaccurate. These methods can lead to bad analyses and gaps in data. Automating the data processing, including the cleaning steps, is important to ensuring that utility data is both accurate and complete. The automation processes described herein can prevent human error and can be performed much more rapidly than conventional manual techniques. The described processes are also scalable, allowing the same set of rules and assumptions to be applied to multiple utility companies. Using a standardized format helps ensure that data across different utilities is compatible, thus allowing for more powerful analyses with more data available. Many of the systems and methods described herein also provide for the generation of new data. The generated data may be used as part of an analysis of utility company's infrastructure. For example, the generated data may be used to more accurately determine the probability of a future pipe break and may be used to identify the type of maintenance and replacement work that should be performed.

Data wrangling (which may also be referred to as data cleaning) is an important but potentially time intensive process for an analysis of large infrastructures, such as utility pipes. Data cleaning alone can often take up over 80% of the time for an analysis project. Part of the reason for the length of this process is the fact that input data can arrive in an large number of different formats. Sometimes, data may be exceptionally clean with few gaps. More often than not, however, the data needs to be thoroughly wrangled, with values being corrected and missing data being imputed.

When it comes to data from water utility companies in the United States, there are a larger number of possibilities in how data is stored and recorded. For example, when recording pipe material names, there is no consistent standard across all utilities for how to record this information. One utility may reference Cast Iron pipe as "CIP" while another might spell out "Cast Iron". When running an analysis with multiple water companies, it is vital that this information remain consistent. Another issue with utility data is the prevalence of errors. As pipe and break information is manually input, the likelihood of human error is high. Small errors can have big effects on further analyses, as a bad input data leads to inaccurate results.

In addition, sometimes water utilities do not collect enough information to complete an analysis. In these cases, this data needs to be generated. For example, not all utilities have geolocated break data, which can be important for running a geospatial analysis and identifying which pipes had breaks. To mitigate this, break data may be located based on street addresses. Another example of insufficient data, is pipe data that does not identify the year for which a pipe was installed. Such information is important for running age-based analyses as well as imputing missing material data. Accordingly, system and methods described herein allow for additional information to be generated based on utility data and available public data. For example, the system may impute the date for which a pipe was installed by analyzing the year or years one or more nearby buildings were constructed.

FIG. 1 is a block diagram illustrating aspects of data cleaning for a water utility company, according to some embodiments. In order to automatically process utility data, the data may be uploaded to one or more servers as shown in block 110. For example, water utilities can upload pipe data and break data in any number of formats, including, for example, shapefiles, CSV files, Excel files, gdb(geodatabase) files, or GeoJSONs. In addition, utilities may fill out a survey which contains questions on their data and the acronyms they use. Once the utility data is uploaded, it may be checked by an operator who may decide if additional data is necessary. The data may be uploaded to a file server and on which an instance of the automated data wrangling tool may be generated.

In block 112, an automated data wrangling tool may fill in and correct various information for the pipe data. Missing or incorrect Information may include pipe material, diameter, installation year, surface area, and length, all of which may be filled in or corrected automatically by the data wrangling tool. For example, when a utility's data does not include the installation year of a particular pipe, the automated data wrangling tool may use parcel data to impute pipe installation years. In particular, the parcel data may include a date or dates at which buildings at or near the pipe were constructed. Any pipe within a particular distance from these buildings may be assigned an installation date that corresponds to the building construction date. The Data Processing tool may also standardizes column names and material acronyms.

In cleaning the utility's break data, in block 114, the automated data wrangling tool fills and corrects information break data and matches the break to its appropriate pipe. If the break data has not been geolocated, the automated data wrangling tool can locate the break provided an address or latitude and longitude is given.

Once the automated processing is complete, in block 116, both pipe and break data may be output in preparation for customer download or for further analysis.

Figure 2:
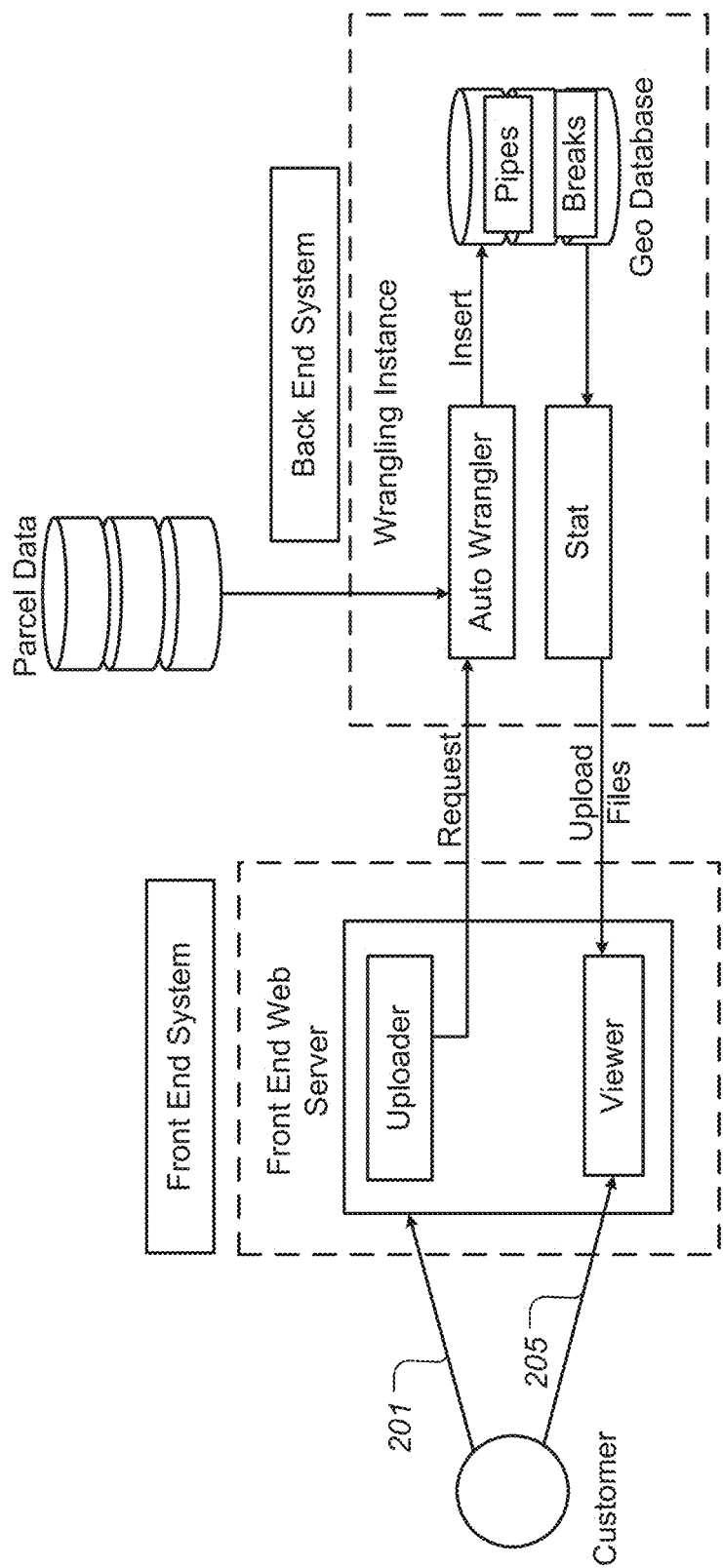
FIG. 2 is a diagram illustrating a possible architecture for a wrangling system for water utility data, according to some embodiments.

FIG. 2 is a diagram illustrating a possible architecture for a wrangling system for water utility data, according to some embodiments. According to some embodiments, information may be obtained and provided to a customer utility company through a web interface. For example, in step 201, one or more front end web servers may be configured to provide utility customers with secure access (via secure login) to a web interface that allows each utility customer to upload utility data. In addition, the web interface include a viewer that allows utility customers to view/download information, such as statistics and analysis of the customer's utility data (205). The web interface may include a plurality of pages. For example, front end system may provide: a page for uploading pipe data, break data, and any supplemental data; a text box to input material acronyms and column names; and a page for downloading wrangled data, including maps of cleaned data. A management system may provide for: a management server for the creation of instances and processes; a database containing client information; and a file server for hosting raw and cleaned files. A wrangling instance may provide for: the auto wrangling scripts; and a temporary and/or permanent database for hosting files.

Before the processing of pipe and break data, the data may be uploaded to a file server, where it is processed. According to some embodiments, a web portal is provided through which a utility company may upload pipe data, break data, and supplementary information such as material acronyms and column names, etc. For example, utility data may be uploaded as a shapefile, CSV file, Excel file or gdb(geodatabase) file. Supplementary information that the utility provides includes data column definitions, a list of known materials used, and identification of any unknown material acronyms.

Figure 3:
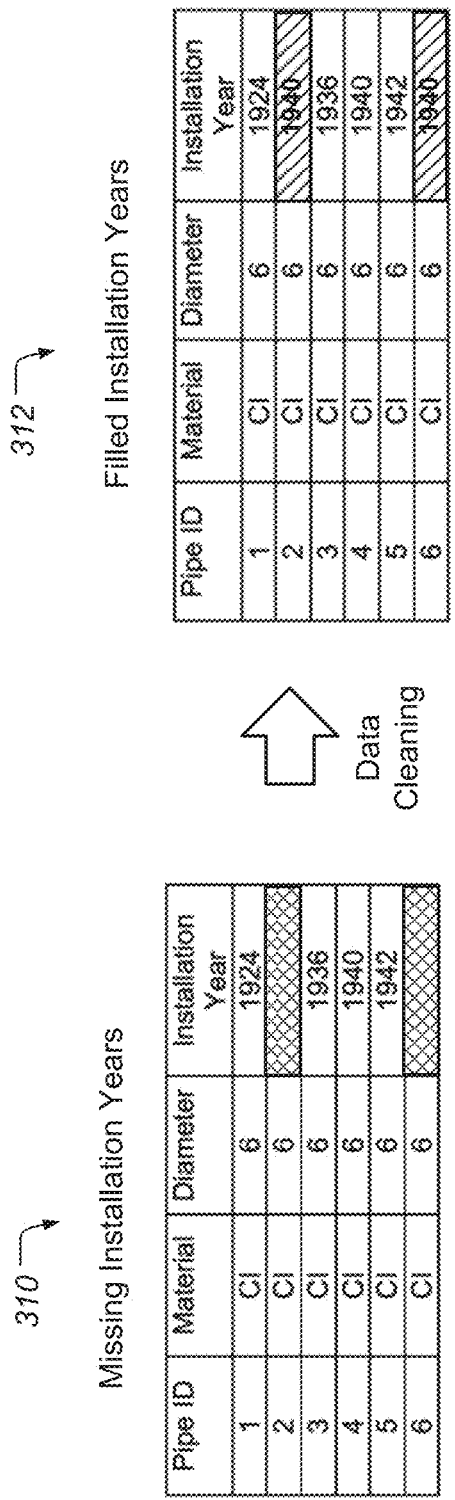
FIG. 3 is a diagram illustrating automatic filling of installation year data with other pipe values, according to some embodiments.

FIG. 3 is a diagram illustrating automatic filling of installation year data with other pipe values, according to some embodiments. Without installation year data, it may be difficult to provide an accurate analysis of pipe condition or impute other pipe characteristics. According to some embodiments, utility data such as a utility's pipe installation year data is automatically filled in and/or corrected. In the example shown in FIG. 3, a utility has some pipe installation year data. The server is configured to automatically fill the rest using patterns from other data sources. In such cases, the server may identify rows with missing installation year values. These rows may be filled in based on the installation years of other rows that include installation year values. The server may analyze pipes that have similar attributes to a particular pipe that has missing information, such as a missing installation date. The server may determine the dates of installation for those pipes that are located within a certain distance from the particular pipe and/or those pipes that are made of the same material and/or same diameter as the particular pipe. The server may then assign a data field for the particular pipe with data that corresponds to those pipes having a similar attribute. For example, the server may fill in a data field for a cast iron pipe with a missing installation year by using the median installation year of other non-null Cast Iron pipes of a similar diameter. If the data includes an installation date instead of year, the server may automatically convert this data into a year for easier use, or vice versa.

According to some embodiments, if the utility has no installation year data or missing installation year data within a certain threshold, this data may be imputed using parcel data. Parcel data may be collected, which contains information relating to the date at which buildings, or other structures, were constructed on particular plots of land. The parcel data may be collected from private or publicly available data. For example, a server may be configured to perform a search of various databases or online sources to identify parcel data associated with plots of land at or near particular pipes of interest. The server may also be configured to receive parcel data via a webpage directly from the utility company or other user. The parcel data may be wrangled so as to convert the parcel data to a particular format and to correct errors that are present in the parcel data. For example, parcel data from multiple sources may be compared to one another, and a corresponding construction date may be used based on the dates provided in the plurality of sources. In particular, if different dates of construction are provided for a particular building a median date may be used. Alternatively, the server may be configured to use the earliest or latest available construction dates for particular types of buildings or structures. In addition, empty construction date values in the parcel data may be filled with median values of construction dates for surrounding structures.

As shown in FIG. 3, a user interface may provide an indication that particular utility data entries are empty, as well as an indication for data entries that have been imputed based on other data. For example, the utility data 310 provided by the utility company in FIG. 3 does not identify the installation year for pipes having Pipe ID 2 and 6. Accordingly, the server may be configured to present the utility data in a manner that indicates data is missing, such as by highlighting these data fields in red, or by providing some other visible indication that data is missing. In addition, once the missing installation dates have been imputed through the automated data processing tool, the server may be configured to present the imputed data fields with a visible indication that the data constitutes imputed data. For example, in 312, the imputed installation year data for pipes having Pipe ID 2 and 6 have been highlighted in yellow, so as to indicate that these dates were not included in the original utility data, but have been imputed. In addition, the server may be configured to provide additional information regarding the manner in which particular data has been imputed. In particular, a user may be allowed to select data entries provided by the user interface. Upon selection of a particular data entry, the user interface may provide information indicating where the data originated or how the data was imputed. For example, if an imputed data entry is selected by a user, a pop-up window may appear that lists the data upon which the imputed data entry was based.

Figure 4:
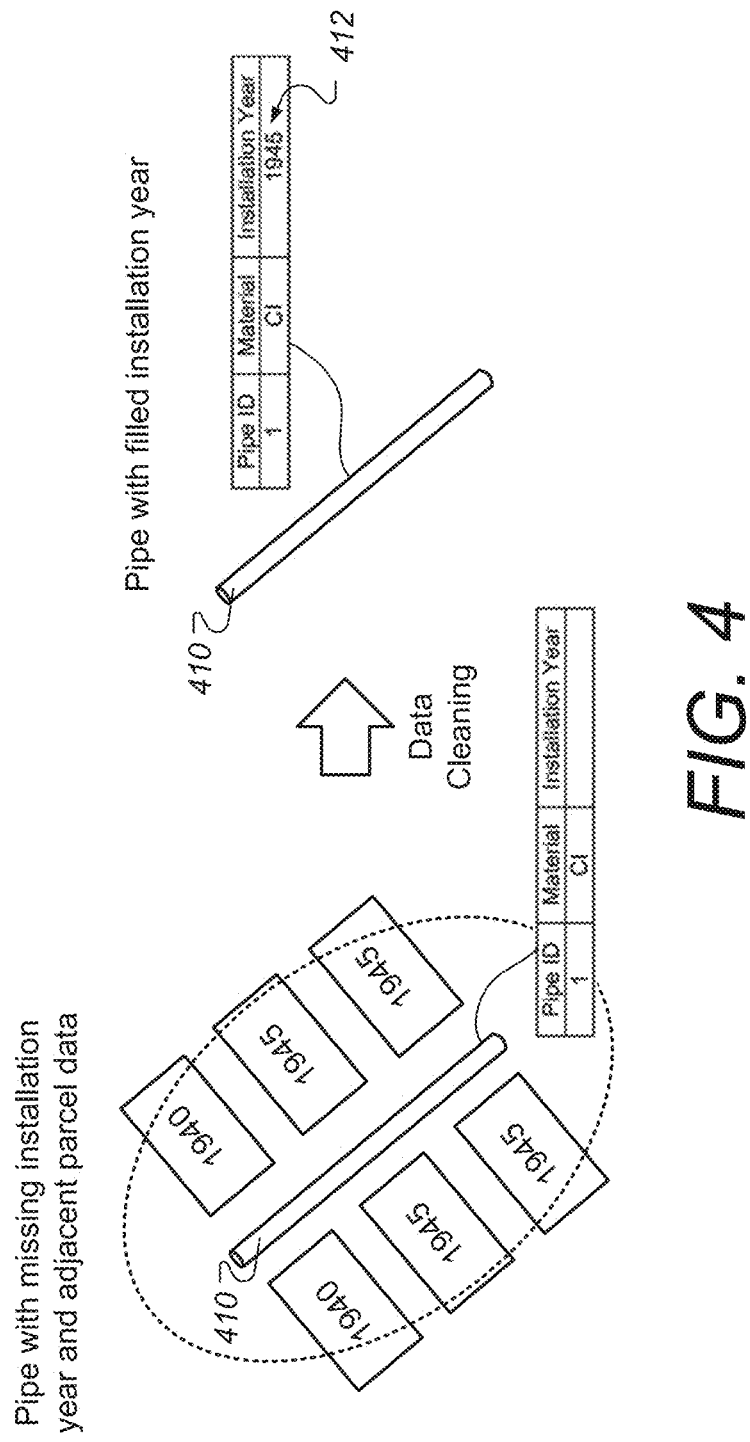
FIG. 4 is a diagram illustrating aspects of automatically filling pipe installation year data using parcel data, according to some embodiments.

FIG. 4 is a diagram illustrating aspects of automatically filling pipe installation year data using parcel data, according to some embodiments. Parcel construction years can be used to estimate installation years for utility pipe data. In the examples shown in FIG. 4, the median construction year of parcels located within a certain radius around a pipe 410 are used to fill in the installation year for each pipe, so as to generate an imputed data entry 412.

Figures 5, 6:
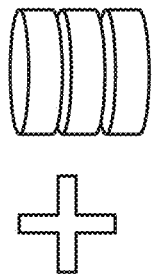
FIG. 5 is a table showing standard material installation year ranges, according to some embodiments.
FIG. 6 is a diagram illustrating filling pipe material information based on installation year and water utility industry information, according to some embodiments.

FIG. 5 is a table showing standard material installation year ranges, according to some embodiments. According to some embodiments, the system not only fills in missing data, but also corrects it as well. FIG. 5 shows ranges of years for which particular material were used for utility pipes. By using standard install year ranges from the American Water Works Association ("AWWA") or similar organization, a server may be configured to identify pipes of certain materials with inaccurate installation years. For example, the server can identify a mismatched 1925 plastic pipe and correct it, so as to generate an imputed data entry that replaces an incorrect data entry. According to some embodiments other ranges can be used. For example the ranges can be customized for a particular customer. According to some embodiments, different ranges can be used for different customers.

FIG. 6 is a diagram illustrating filling pipe material information based on installation year and water utility industry information, according to some embodiments. The data processing system has the ability to correct and fill pipe material data based on the utility's own data as well as data that has been collected from other sources. This allows for deeper analyses to be made, as well as allowing utilities a greater understanding of their own data.

Material information may be filled using installation year data, either from the utility's own data or by third-party or public data, including by data that was autonomously collected by a server. Using install year ranges from the AWWA (or similar organization) basic information provided by the utility such as material acronyms, and previous material acronyms that have been previously collected, material values can be successfully imputed. For example, the server may be configured to identify the installation year ranges as seen in FIG. 5 based on the identified material of the pipe.

In some cases, general categories may be used to classify materials, such as Cast Iron or Plastic, instead of specific names such as Cement Lined Cast Iron or High Density Polyethylene. This may be done in order to ensure that uncommon materials can still be categorized and used for analysis in connection with a general category.

In the case of a mismatch of installation year and material, the disclosed system can correct this based off information from AWWA (or similar organization). For example, a 1990 Cast Iron pipe would be changed to Ductile Iron.

Figure 7:
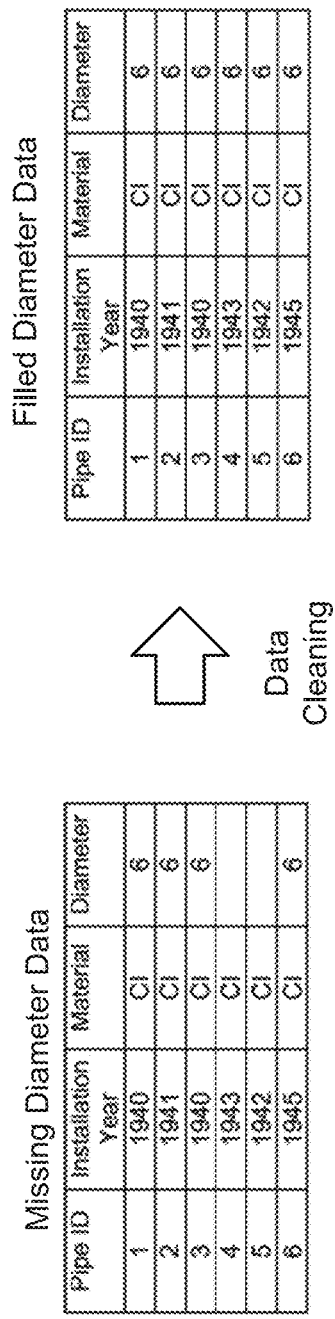
FIG. 7 is a diagram illustrating automatically filling in pipe diameter data based on other pipe characteristics, according to some embodiments.

FIG. 7 is a diagram illustrating automatically filling in pipe diameter data based on other pipe characteristics, according to some embodiments. Pipe size, including pipe diameter, is important information to have in order for various forms of analysis to be done. Accordingly, the disclosed system allows for filling in any missing diameter information or correcting diameter information that is incorrect.

If a pipe is missing diameter information, a server of the disclosed system can be configured to automatically fill in this data using other pipe attributes. This may be performed by the server accessing a database of information that associates various pipe features with particular diameters, or a particular range of diameters. For example, a 1940s Cast Iron pipe with a missing diameter entry can be filled with the most common value of other 1940s Cast Iron pipe.

If there is a pipe of a singular material and a missing diameter, the server may impute the diameter to be the most common diameter of pipe used by a particular water utility or the most common diameter of nearby pipes. For example, if 8 inches is the most common diameter for pipes used by water utilities, then diameter entries for a water utility may be imputed to be 8 inches.

According to some embodiments described supra, data collected from a customer utility company, data from the AWWA (or similar organization), and other sources are collected in order to fill and correct pipe data based on standard rules. According to some further embodiments, machine learning can also be used in order to fill and correct pipe material, diameter, and installation year data. According to some embodiments, a machine learning algorithm is built solely from the utility company's data. For example, if a utility is missing 30% of its material data, the rest can be filled by finding correlations between material and other pipe attributes such as installation year or diameter. Installation year and diameter data can be imputed and corrected following a similar process.

According to some other embodiments, a machine learning algorithm is built from the utility company's data and other public data such as population or zoning. If 30% of a utility's material data is missing, the rest can be filled with a machine learning model that uses the other pipe attributes in conjunction with public data. For example, pipe material data can be filled with a machine learning model that finds the correlation between pipes that contain material values and other public data such as population or zoning.

By using these automated methods, pipe leakage prediction and job planning can be provided to utilities with large amounts of missing data. Gaps in the utility's own data will not be as significant, as an internal database of public and other utility data can be sufficient to fill in the gaps.

Utilities will typically keep a record of pipe breaks. However, not all utilities have this data recorded in a way that can be easily accessed or displayed, such as by allowing the break data to be displayed on a map. In processing break data, a server may be configured to geolocate utility break data in order to place them on a map.

Figure 8:
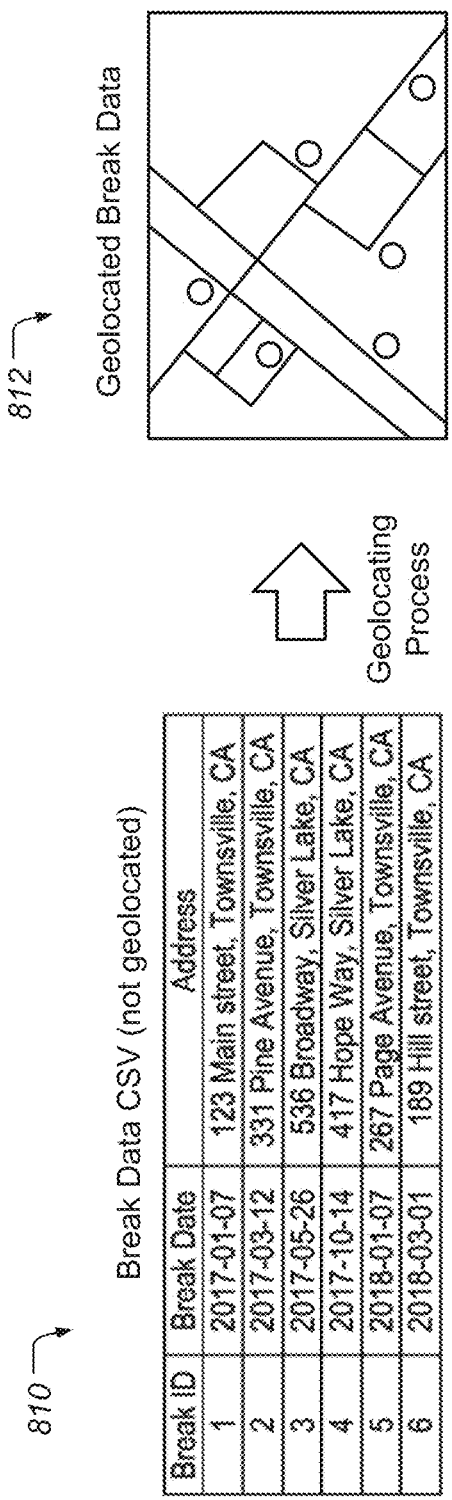
FIG. 8 is a diagram illustrating geocoding of break data, according to some embodiments.

FIG. 8 is a diagram illustrating geocoding of break data, according to some embodiments. When recording break data, most utilities record the street address of the break. Using this information, the server associates the street address with a particular latitude and longitude for every break. According to some embodiments, a geocoding API, such as the Google Maps API, is used in order to locate every break with an address provided by the utility company. In addition, the break data can be analyzed so as to remove breaks located in unlikely locations. This may be accomplished by creating a buffer area around the pipe network and removing breaks that fall beyond the boundary of this buffer area. For example, the buffer area may be defined as all pipes within 300 meters of existing pipes. Additionally, if the utility's break data contains no information regarding location but at minimum contains the ID of the pipe where it occurred, the break can be geolocated to the center of the pipe. As shown in FIG. 8, break data 810 is provided by a utility company in the form of pipe ID, break date, and street address. This information is then converted by a processor into geolocated break data 812, which may be displayed on a map that can be provided to the user as part of a user interface. The points displayed in the map may represent the location at which breaks occurred. This location may either be directly over the geolocation of a street address or may be over the geolocation of a pipe that is closest to the location of the street address. According to some embodiments, the system may also allow for particular points to be selected by a user, whereby additional information regarding a particular break is displayed to the user. For example, the map may indicate, with a thumbtack or other displayed indication, that a break occurred at a particular pipe location. Upon selecting the displayed indication, the user may be provided with information regarding the date(s) at which the break(s) occurred.

Figure 9:
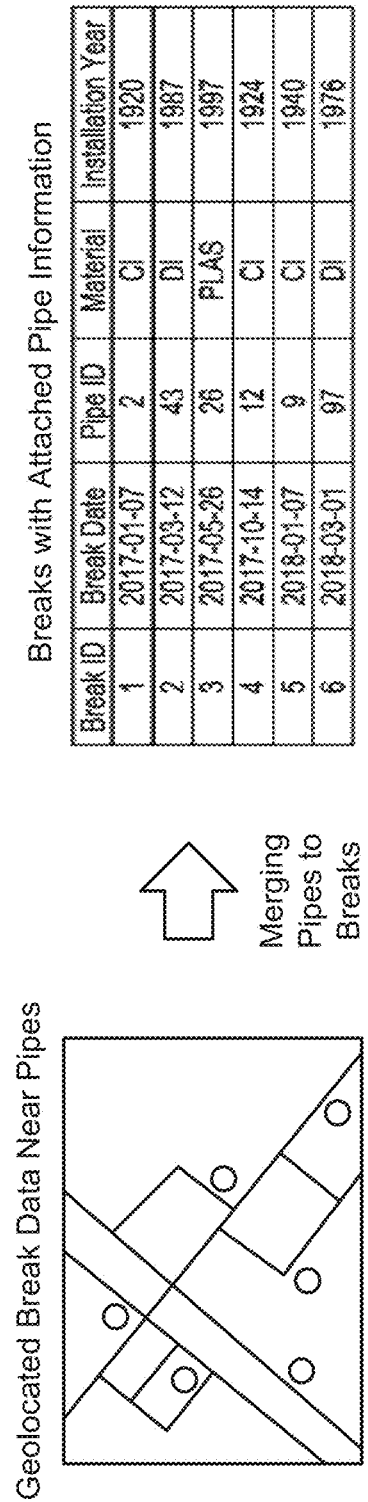
FIG. 9 is a diagram illustrating joining pipe data with break data, according to some embodiments.

FIG. 9 is a diagram illustrating joining pipe data with break data, according to some embodiments. Connecting break data to the pipes they occurred on can provide valuable insights on what types of materials and vintages are the cause of most breaks. Unfortunately, many utilities have not recorded this information. However, the automated data processing tool may accomplish this. Using geospatial methods, the system may match a geocoded break to the nearest pipe. If break data originally has information about pipe attributes, such as install year, diameter, material, etc., and one or some of the attributes don't match to the ones of closest pipe, the second pipe will be selected. This process can be repeated until distance between break point and center of pipe segment reaches to some threshold or no pipe can be selected. If no pipe is selected, the break point is taken as one which occurred on an abandoned pipe. The system may then attach pipe data, such as the pipe's ID, material, and age, to the break. Further analysis can then be done on the breaks in order to predict the likelihood of future breaks in the same pipe or in other pipes. In addition, maintenance and replacement plans may be generated and provided to the utility company based on the analyzed break data. As shown in FIG. 9, pipe data and break data may be merged together so that breaks are associated with particular pipes.

FIG. 10 is a diagram showing data received from an example case customer. In this illustrative example case, ACME Water is a utility with poor pipe and break data quality and is interested in using the system disclosed herein to process its pipe and break data. First, ACME Water may access a web portal and upload its pipe data 1010 and break data 1012 using the web portal user interface. For example, ACME may upload a pipe shapefile, a break CSV, and provide a list 1014 of column names, material acronyms, and materials used.

This data is received by the backend system, as shown in FIG. 2, and may be reviewed by an operator. The operator may note that the pipe data has no installation year data and select the appropriate parcel data from a database. Alternatively, the backend management system may automatically identify missing data entries, without any operator input, and automatically identify the location of relevant data, such as parcel data, that is available online or at one or more databases. The pipe data may then be processed by the data processing tool so as to clean the data, including reformatting the data and imputing missing or incorrect data.

FIG. 11 is a diagram illustrating a process for cleaning pipe data for an example case customer. The backend system may convert the received utility files into a standard format. This may include converting particular identifiers to predesignated acronyms and converting dates into a uniform format, such as providing all dates as a four digit year, or by converting a date that contains a non-numerical month to a numerical year, month, and date format. Using the parcel data, the backend system may fill in the installation years for the pipes, as well as other missing data, such as materials, diameters and the like. The backend system may also review the material data, changing acronyms to a particular naming convention. In one aspect, the system may use the installation year data, to fill in missing material data and to correct any mismatched values. In addition, the system may review the diameter data to fill in and correct values based on material and installation year data.

FIG. 12 is a diagram illustrating a process for cleaning break data for an example case customer. The break data may be received as a CSV that is or is not geocoded. If the address for every break is recorded, the system may geocode every break using the address, by associating a latitude and longitude to each point. Once this is done, the system may attach the breaks to the nearest pipes using the cleaned pipe data. The system may then project the break data into a standard coordinate reference system.

With both pipe and break data processed by the disclosed system, the processed data may be returned to ACME Water for its own use. The data may be accessed via a downloadable file. In addition, a user interface may be provided at the web portal, wherein the processed data may be viewed in the form of a tabular output, as well as in the form of a displayed map. For example, the location of pipes and break data may be overlaid onto a map and displayed to a user via the web portal or via downloadable file. In addition, the disclosed system may generate descriptive statistics as well as perform further analysis with this new processed data. In particular, the processed data may be analyzed using machine learning process that are described in the Co-Pending Patent Applications. As set forth the Co-Pending Patent Applications, utility data may be analyzed so as to create various prediction models by which future pipe breaks may be predicted. In accordance with the current disclosure, the processed data described herein may be used to create one or more prediction models. In this way, the prediction of future pipe breaks may be based on cleaned data, including data values that have been imputed due to missing or incorrect data, so as to provide for a more accurate prediction model. In addition, the processed data may be used in a job planning algorithm to generate improved pipe maintenance and/or replacement plans. For example, the processed data may be used to identify particular pipes that have a likelihood of failure that exceeds a particular probability threshold or for which maintenance and/or replacement provides for a particular amount of projected savings.

Further detail regarding geoprocssing data will now be provided. In order to be able to geoprocess data, this data first needs to be collected. Data from a wide variety of sources, such as public organizations like the US Department of Agriculture and private sources such as Open Street Map, can be used. This data is then aggregated and stored.

Next, geoprocessing is performed in order to convert the data into a form that is usable for data analysis. Raster data that is collected is merged and vectorized. Vector data that has been collected is also merged or split into separate pieces to reduce computational cost. The data is cleaned, with missing values imputed and outliers being removed. In addition, depending on the situation data resolution can be improved for more granular results or generalized to reduce computational costs. Additional variables useful for analysis are then generated. Next, data is recategorized and renamed. Finally, this national data is joined to other data that can be used for analysis.

After having completed these steps, a unified set of data containing national environmental data, along with target features, can be used for analysis.

Environmental data such as elevation is provided in the raster format. FIGS. 13A and 13B are diagrams illustrating possible issues with raster data. A singular file for elevation across the entire United States does not exist. Instead, this elevation data is split into multiple raster datasets representing different areas of the country. Merging these datasets together can be complicated, because there is no guarantee that rasters don't overlap (e.g. FIG. 13A). In addition, a raster's top left point may start from a different location from another raster, meaning the gap between 2 rasters (e.g. FIG. 13B) may not necessarily be N×pixel, where N is an integer.

Figure 14:
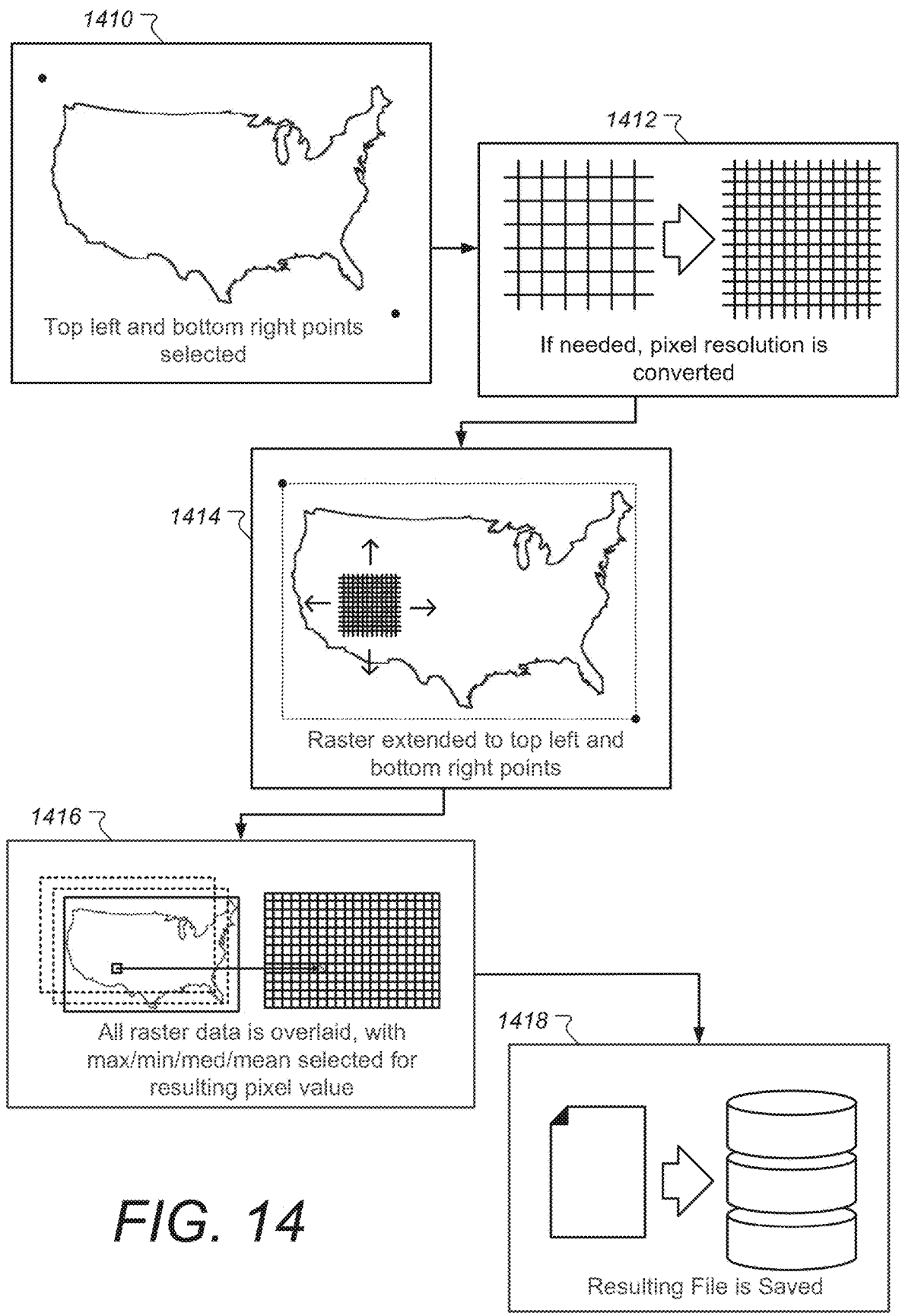
FIG. 14 is a block diagram illustrating a process for merging raster data, according to some embodiments.

FIG. 14 is a block diagram illustrating a process for merging raster data, according to some embodiments. In block 1410, the top left point and bottom right point which covers the entire US is selected. In block 1412, if needed, the pixel resolution of the raster data is converted (This step can be switched with block 1414). Changing raster resolution is described in further detail infra. In block 1414, each raster dataset is extended to the top left point and the bottom right point (This step can be switched with block 1412). Pixels for the extended part may be filled with a proper value like 0. This filling value depends on the data to process. If the raster is extended to V×integer, where V is a floating-point number, the closest pixel value or average in an area is used. In block 1416, all raster data is overlaid, using the maximum/minimum/mean/median value of each pixel, and using the value as the resulting pixel value. If all raster files cannot be loaded onto memory, groups of rasters are made and blocks 1410, 1412, 1414, 1416 and 1418 are performed recursively. In block 1418, the resulting raster data is saved on disk or in Geo DB. For example, this geoprocessing step is used for elevation data, slope data, (by county/state) soil density, etc.

FIG. 15 is a diagram illustrating vectorizing raster data, according to some embodiments. In order to use the national data for analysis, vector data can be used. Vector data is useful in that it is flexible when used in many kinds of geo-spatial-analyses. In order to convert raster data to vector data, a process known as vectorization is performed. If raster data is vectorized, pixels are converted into multiple square polygons. Vectorization is often performed, because in order to perform a geo-analysis, a spatial-join is generally used. Vector data is often the optimal data format for that analysis.

However, an issue is that vectorized raster data tends to be a much larger size than the original raster because the vertices of every vector object needs to be stored explicitly.

When vectorizing raster data of a large size, the memory size of the resulting vector data needs to be taken into account.

With an ordinary desktop PC (eg. desktop PC with 32-64 GB memory), it is impossible to accommodate all the resulting data when vectorizing raster data on a national scale (Resulting data size can be 100 GB-1 TB or more).

In order to solve this issue, the raster data can be split into multiple rasters, with each individual raster being vectorized. All split rasters can be multi processed, with the resulting raster data being saved on disk or in a Geo Database. When saving these rasters, consideration is taken to avoid overwriting previously saved files as well as giving each file a unique name.

FIG. 16 is a diagram illustrating splitting raster data in preparation for vectorization, according to some embodiments. First, the maximum size, x-size and y-size, is set for the split raster data. For example, if the original raster data is 1,000,000×1,000,000 pixels, this raster is split based on x-size and y-size. When x-size=1000 and y-size=1000, the raster is split into 1,000,000 (=1,000×1,000) rasters. Next, the split rasters are vectorized individually with the option to multi-process. Finally, the resulting vectors are saved on disk or in Geo DB. The resulting vectors can be merged programmatically as described infra or by inserting each vector into the same table in Geo DB. This geoprocessing step can be used to vectorize national elevation raster data, national slope raster data, national climate raster data, etc.

As seen with raster data, sometimes the merging of multiple large vector datasets in order to get a singular vector dataset is preferred. This may be done in order to reduce the number of resulting files needed to manage. For example, data gather by county includes thousands of files and data gathered by state includes 50 files. National data would only include 1 file.

Unfortunately, some vector data formats have an upper limit on the number of features to merge. According to some embodiments, this limit can be avoided by doing the following steps. First, each vector is loaded, with its CRS converted into EPSG: 4326. Next, all files are converted into CSVs with WKT geometry. Next, all CSV files are concatenated vertically, as depicted in FIG. 17. Next, CSV files are reverted to the original vector format or other preferred format. Next, CRS (EPSG: 4326) is added to the vector data. Finally, the resulting vector file is saved on disk or in Geo Database. This geoprocessing step can be used to obtain a single file for national zoning data and 50 files for state population data.

Environmental data is generally provided as vector data. Some of these datasets have geometry and attributes separately, so they should be joined. For both these cases, attributes of vector data may sometimes have missing values.

Figure 18:
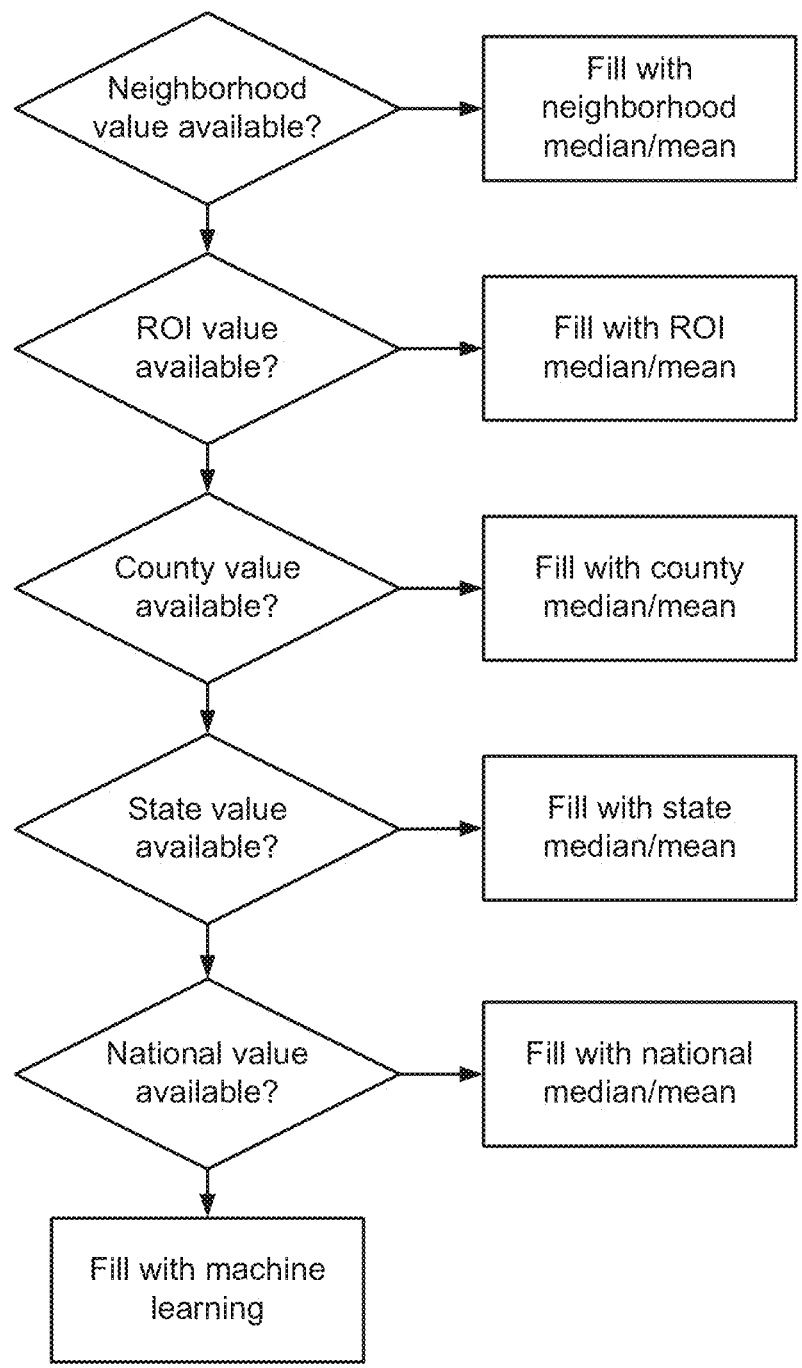
FIG. 18 is a flow chart illustrating a hierarchy for imputing missing attributes in environmental data, according to some embodiments.

FIG. 18 is a flow chart illustrating a hierarchy for imputing missing attributes in environmental data, according to some embodiments. Through the use of other environmental data, missing data can be filled. For example, a prediction model with environmental data like building data and population data can be built (Supposing population has some missing values). Population may be provided in vector format and its shape may be block data. To build a prediction model, first centroids of the population data's blocks are used to build a model using environmental data (like number of buildings) in the neighborhood of the centroids, using available population values. Next, the resulting model can be used to predict missing population values based on environmental data in the neighborhood of the centroid of the blocks whose population values are missing.

For example, this geoprocessing step can be used for soil, population data, climate, elevation, slope, etc. Additionally, these same methods can be applied for data that is not necessarily environmental but still useful for analysis, for example, filling in installation years, diameters, material, etc. for pipe data.

Environmental data collected from government sources may include outliers. For example, a pH value of 17, a temperature value of 1000, a slope value of 120, etc. All of these values are clearly outliers. In order to correct this, these values are removed programmatically.

Thresholds for these values are based on subject-matter (physics, chemistry, etc.) knowledge. For example, knowing that the threshold for reasonable pH values falls between 0 and 14. These thresholds may also be created based on the following process: (1) the mean and standard deviation of the attribute is calculated; (2) an upper limit is set to the mean+N*standard deviation (where N is an integer); (3) a lower limit is set to the mean−N*standard deviation (where N is an integer); (4) if the value is greater than the upper limit, it is replaced it with the upper limit or imputed (described in further detail, infra); and (5) if value is smaller than the lower limit, it is replaced with lower limit or imputed (described in further detail, infra). For example, this geoprocessing step can be used for soil, population, climate, elevation, slope, etc.

In order to build an effective analysis, high resolution data is needed. However, sometimes high-resolution data isn't available. For example, climate raster data sometimes has low resolution, with one-pixel size being 400 m×400 m. In order to differentiate between environmental factors, higher resolution data can be generated from the original lower resolution data. In order to do so, the following can be done: (1) the raster's pixels are split; and (2) a smoothing filter is applied. For example, this geoprocessing step can be used for climate, elevation, slope, etc.

Figure 19A:
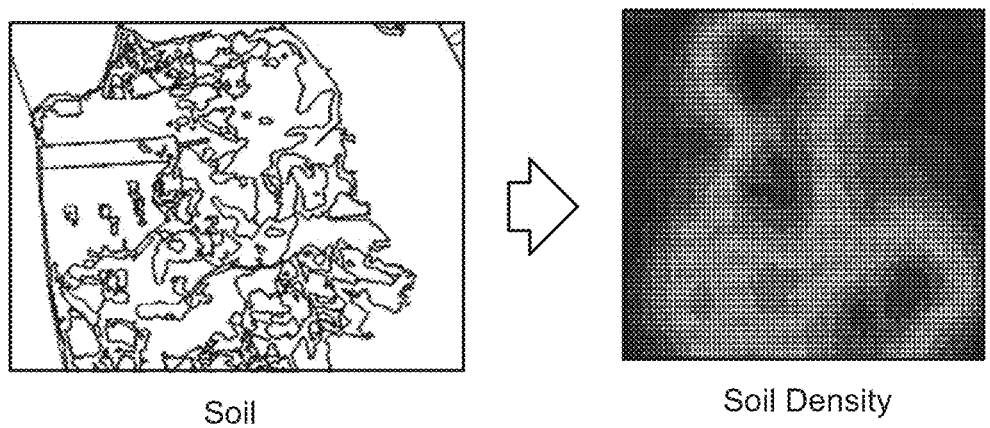
FIGS. 19A-19C are diagrams showing examples of new environmental variable generation, according to so some embodiments.
Figure 19B:
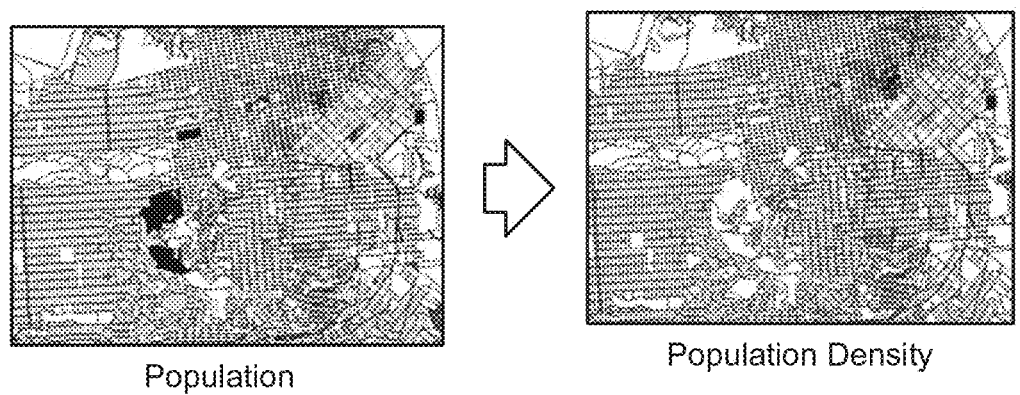
Figure 19C:
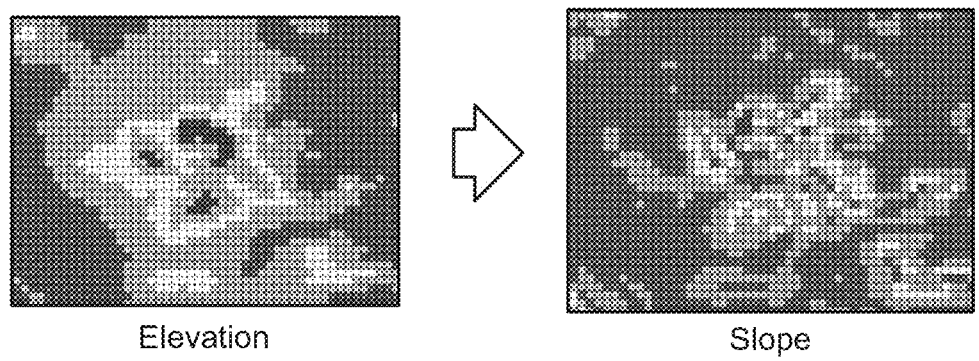

FIGS. 19A-19C are diagrams showing examples of new environmental variable generation, according to so some embodiments. Sometimes in order to build a better analysis, more data is needed. New kinds of environmental data can be created based off of other accessible environmental data. For example, density information can be built from soil data and population data, resulting in soil density and population density. In FIG. 19A, soil density is built off of geographic information related to soil types and represents the amount of different types of soils in an area. In FIG. 19B, population density is built off of population values with a certain area and represents the compactness of population in an area. In FIG. 19C, from elevation, slope data can be generated. Proximity of target features to other features can be built as well. For example, the proximity of different kinds of line data, such as roads (primary road, motorway, etc.), rails (regular railway, light railway, subway, tram, etc.), linear water (river, stream, canal, drain, etc.), shoreline, etc., can be generated. Proximity to point data such as rail stations (railway halts, tram stops, etc.), bus stops (bus stations, etc.), etc. can also be generated. Additionally, the proximity of non-environmental data such as breaks can also be generated.

Figure 20:
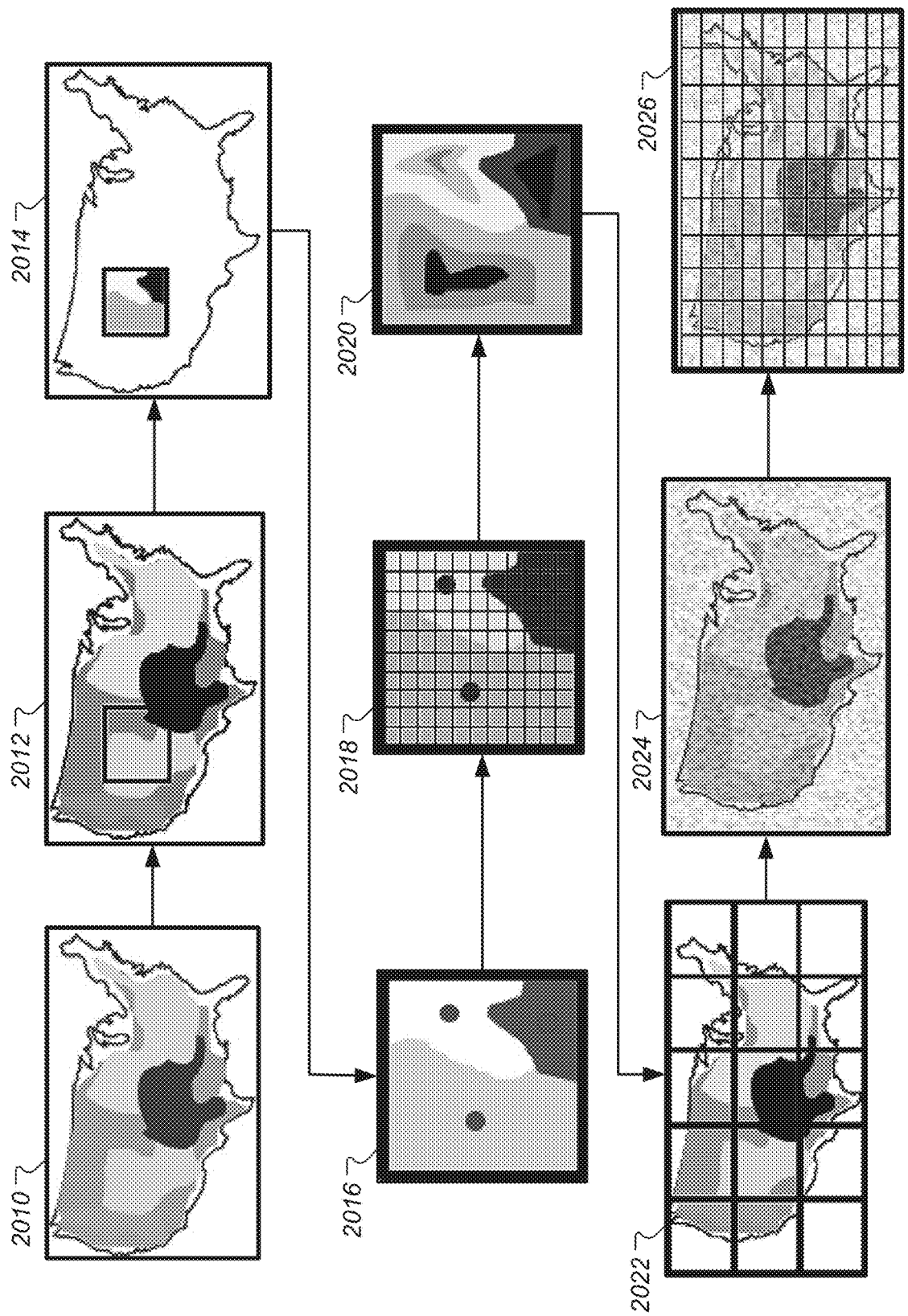
FIG. 20 is a block diagram illustrating generating national density data, according to some embodiments.

FIG. 20 is a block diagram illustrating generating national density data, according to some embodiments. In block 2010, national soil data is prepared. In block 2012, an ROI (radius of interest) window is run. In block 2014, soil vector in ROI is selected. In block 2016, centroids of soil polygons are selected. In block 2018, the soil centroids are rasterized. In block 2020, a raster heatmap from the raster soil centroids is generated. In block 2022 steps 2010, 2012, 2014, 2016, 2018, and 2020 are repeated until the window runs through the entire country. In block 2024, all raster heatmaps are merged (as described, supra). In block 2026, the merged raster heatmap may be vectorized (as described, infra).

In order to create the heatmap, according to some embodiments, Kernel Density Estimation (KDE) is used. KDE is a technique to estimate the unknown probability distribution of a random variable, based on a sample of points taken from that distribution. Various normal distributions (known as Kernel shapes) are used in order to estimate the value of an unknown point. The distance between a known point and the unknown point is used as a parameter. When KDE is applied, the density value of the unknown point decreases smoothly following the Gaussian Probability Density function.

Assuming that population data is in the format of vector and total population is assigned to each polygon: (1) population data is prepared (by county, state, etc.), with missing population values being imputed or filled with zero, and outliers being removed; (2) the area of each polygon is calculated; (3) total population is divided by the calculated area of the corresponding polygon to generate population density, if the area is 0, population density is also 0; and (4) a new attribute field indicating population density is added to the population vector data, or new vector data having the same polygons as the population vector data and having an attribute corresponding to population density is generated.

Assuming that the slope data is a raster file, the national slope data can be generated as follows: (1) the national raster elevation data is prepared (as described in merging raster files supra); (2) the slope is calculated using the commonly used equation shown infra; (3) the resulting raster data may be smoothened; and (4) the resulting raster data may be vectorized (as noted in as described supra). The following formulas can be used for calculating the slope, which refer to the raster matrix of FIG. 21:

$$\frac{dz}{dx} = \frac{(x_3 + 2y_3 + z_3) - (x_1 + 2y_1 + z_1)}{8 \cdot \text{cell\_width}}$$

$$\frac{dz}{dy} = \frac{(z_1 + 2z_2 + z_3) - (x_1 + 2x_2 + x_3)}{8 \cdot \text{cell\_height}}$$

$$dist = \sqrt{\left[\frac{dz}{dx}\right]^2 + \left[\frac{dz}{dy}\right]^2}$$

$$\text{slope}(y_2) = \frac{180 \cdot \tan^{-1}(dist)}{\pi}$$

Using the above methods, different kinds of elevation data may be created, such as mean elevation, median elevation, maximum elevation, minimum elevation, elevation standard deviation, etc. The above steps can be applied to all kinds of elevation data and then all the resulting slope data may be integrated following the process described relating to integrating grid-shaped vectors, infra. Additionally, all elevation and resulting slope data may be integrated in the same or similar fashion.

Figure 22:
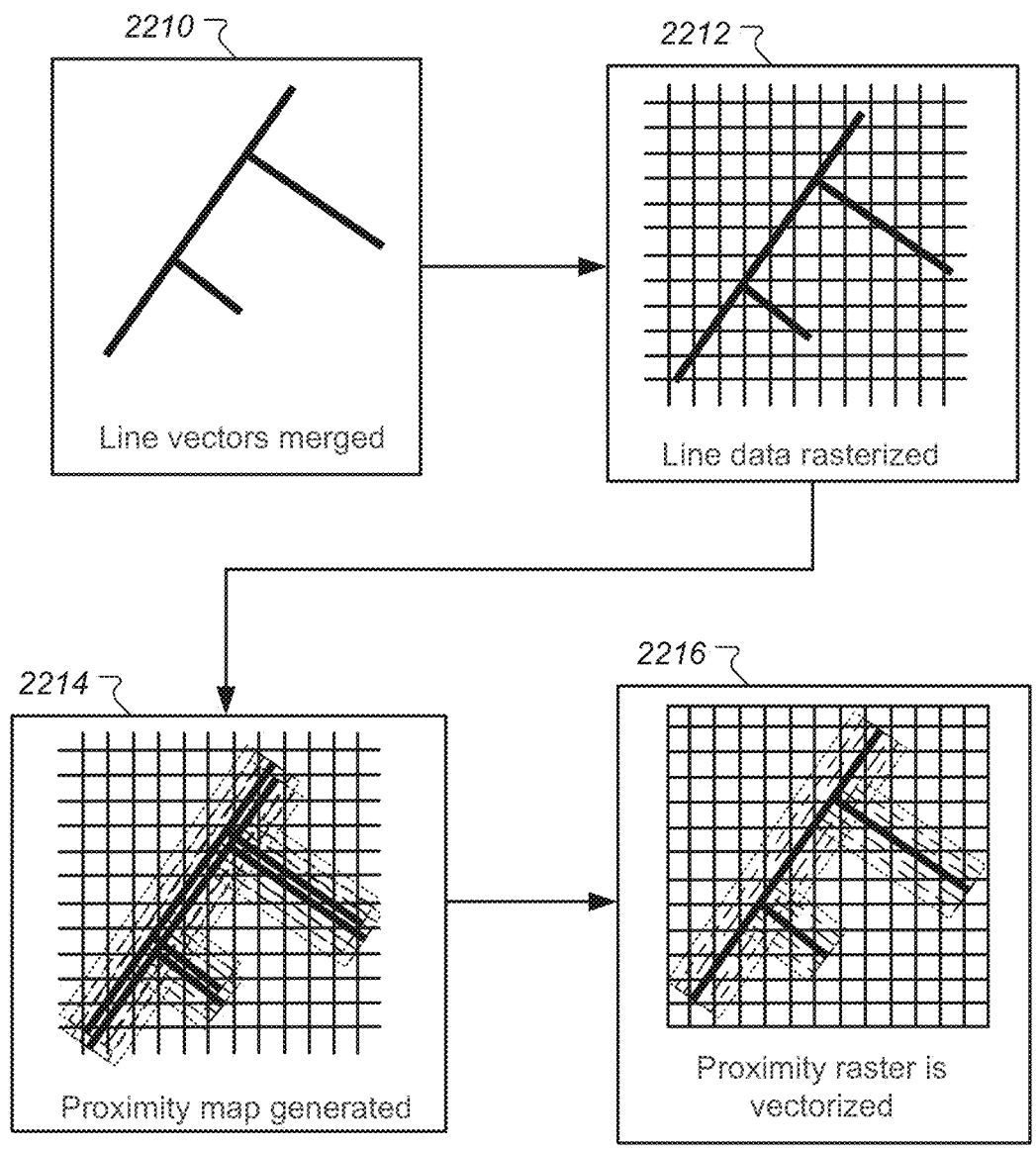
FIG. 22 is a block diagram illustrating creating new variables from line data, according to some embodiments.

FIG. 22 is a block diagram illustrating creating new variables from line data, according to some embodiments. In block 2210 line vectors may be merged as described, supra, if the line data is in vector format. In block 2212, line vector data is rasterized (if data is in vector format). In block 2214, a proximity map is generated (such as using a popular geoprocessing library such as OGR) and a proximity raster is received. And in block 2216, the resulting proximity raster is vectorized. If the resulting raster is very large, it is vectorized following the process described in section 3-2

In order to use point data (such as for bus stop information or pipe break data), the following steps can be preformed: (1) the points are rasterized; (2) a raster heat map from the point rasters is generated; and (3) the raster heat map may be vectorized (as described, supra). This geoprocessing step is useful for incorporating either proximity or density information, such as for bus stop and bus station proximity or generating break density from break point data.

Figures 21, 23:
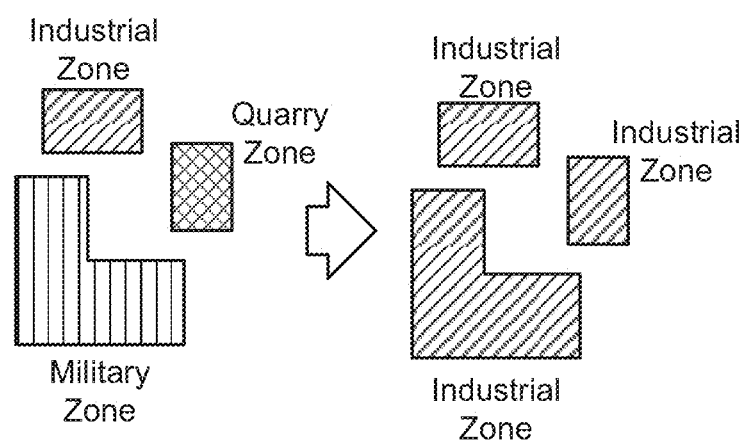
FIG. 21 is a raster matrix used for slope calculations, according to some embodiments.
FIG. 23 is a diagram illustrating and example of re-categorizing zoning data, according to some embodiments.

FIG. 23 is a diagram illustrating and example of re-categorizing zoning data, according to some embodiments. When using zoning data, sometimes the data received may be too specific to be used for an analysis. For example, some zoning data like national park zones may be very rare in the region where it is found to be used for data analysis. Similar types of zoning data can be grouped for an improved analysis. For example, retail zones and commercial zones can be re-categorized as commercial zones; industrial zones, quarry zones, military zones can be re-categorized as industrial zones (as shown in the example of FIG. 23); forest zones, meadow zones, scrub zones, grass zones, heath zones, and national park zones can be re-categorized as nature zones; and farm zones, park zones, orchard zones, and vineyard zones can be re-categorized as artificial nature zones.

An important advantage of generating geoprocessed environmental data is for use in data analysis. For example, environmental data can be used to predict the likelihood of failure of water mains. For LOF prediction, a machine learning model is built which uses pipe, break, and environmental data as input variables. The environment of each pipe needs to be represented using a spatial join. However, the computational cost of a spatial-join and computing which polygons are overlapped by another is very high. If polygons overlapped with pipes need to be checked again and again, the total computational cost increases drastically. The processing includes generating predicted future failure of pipe segments, including segments that have never leaked, as disclosed in said co-pending applications identified in paragraph 0002 herein, including U.S. patent application Ser. No. 16/365,466, incorporated by reference in the subject application.

However, by optimizing the vector data structure, this process can be sped up. This method can be used for square-shaped environmental data and any environmental data which can be approximated as square-shaped environmental data. For example, soil data is arbitrarily shaped, but by filling the coverage of the soil data with tiny tiles, soil data can be approximated as square-shaped soil data.

Figure 24A:
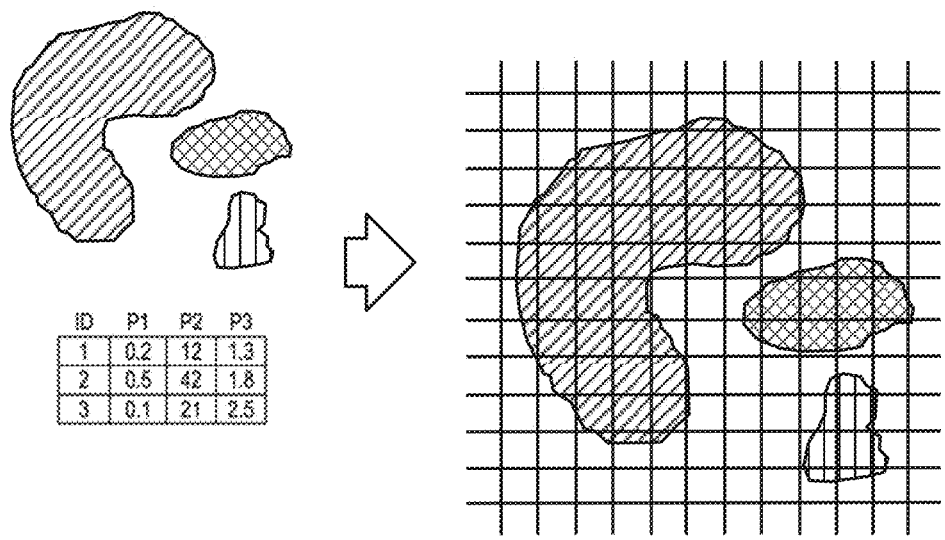
FIGS. 24A and 24B are diagrams illustrating an example of approximating square shaped data, according to some embodiments.
Figure 24B:
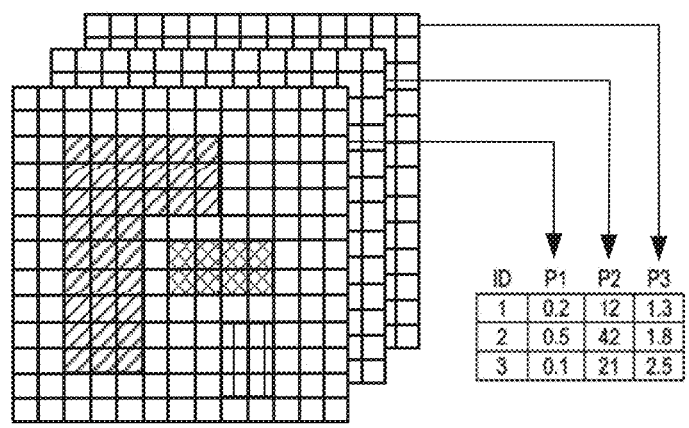

FIGS. 24A and 24B are diagrams illustrating an example of approximating square shaped data, according to some embodiments. In the example shown, in FIG. 24A, the soil has 3 properties (P1, P2 and P3). The data can be converted into 3 rasters whose pixels correspond to each property, or directly converted into one square-shaped vector data by doing a spatial-join. This is useful for soil, climate, elevation, slope, proximities, heatmap (soil density), etc. Originally, this square-shaped environmental data may be in the raster format. For example, if the proximity map of rails, roads, and station is used, these 3 raster data files will need to be vectorized and then spatially-joined 3 times.

Figure 25:
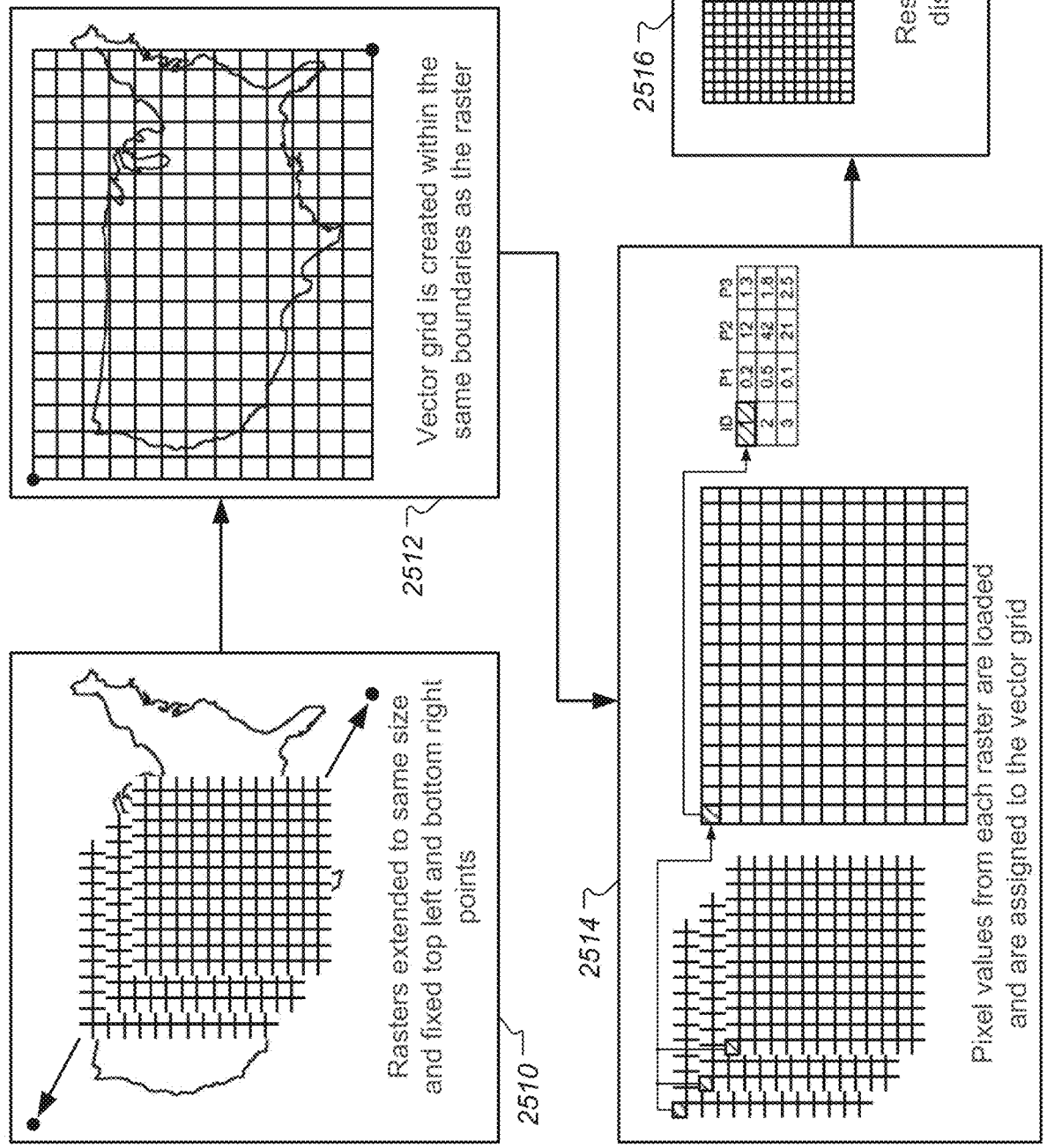
FIG. 25 is a block diagram illustrating an example of integrating grid-shaped vectors, according to some embodiments.

FIG. 25 is a block diagram illustrating an example of integrating grid-shaped vectors, according to some embodiments. The number of executed spatial-joins can be reduced by performing the shown process. In block 2510, rasters whose pixel resolutions are the same are extended to the same size and the same left top point. In block 2512, a grid vector is created which completely overlaps the original raster data (starting from the same left top point geographically, and each grid size is the same as the pixel size of raster data). In block 2514 the pixel values from each raster are loaded and are assign pixel values to each grid. In block 2516, the resulting vector on disk or in Geo DB. In some cases, the resulting vector may be spatially joined to some other vector.

The above example would output a resulting grid vector which contain 3 attributes in it. By using this process, the resulting grid vector would contain all the information contained in multiple rasters.

Note that spatial joins may not be needed when assigning pixel values of raster data to grid vector data, because the created grid vector overlaps the raster data completely. Values can be assigned based on the index of the pixels and grid. The resulting vector data can be used for a spatial-join with other data, such as pipe data.

Without the technique shown, a spatial-join would need to be done three times as in the above example. But by using this technique, only one spatial-join is needed.

Note that national data should be made easily understandable in order to enhance its usefulness. However, attributes of vector data can have many different names. For example, soil attributes might be pH, CaCO3, and other names that may not be so clear. To clarify their usage, the following naming conventions can be used: (1) the addition of a prefix such as "pssn" where the first two characters indicate "Public" and "Standard" and the last two characters indicate "Soil" and "Numeric property"; (2) numbering; and (3) the addition of a postfix. For example, pH and CaCO3 are converted to pssn00 and pssn01 (With prefix and numbering). Total Population and Population Density are converted to pspp00 and pspp02 (With prefix and numbering).

When performing a spatial-join of environmental data to target features, a very large table for LOF analysis is generated. Without these naming conventions, the table includes the original attribute names as column names, making it difficult to sort, filter and identify features.

Figure 26:
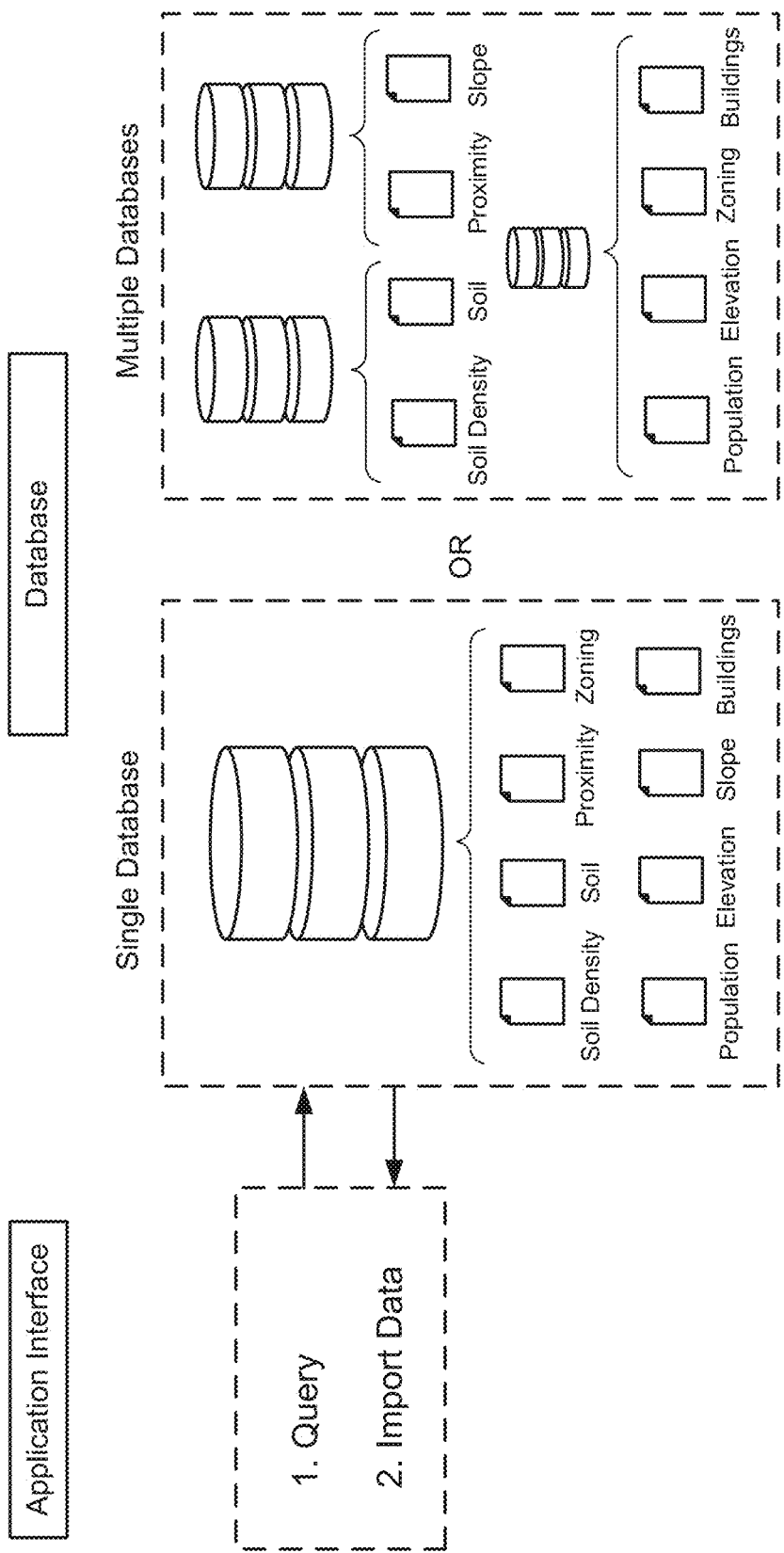
FIG. 26 is a diagram illustrating a geo-database system architecture, according to some embodiments.

FIG. 26 is a diagram illustrating a geo-database system architecture, according to some embodiments. The system includes an application interface portion and a database portion. The application interface portion includes: the ability to query geospatial data; and the ability to import geospatial data. The database portion includes: a single database containing geospatial data; and multiple databases containing geospatial data.

Although the foregoing embodiments have pertained primarily data relating to networks of underground pipes, according to some embodiments many of the techniques described can be applied to data pertaining to other types of networks. According to some embodiments, the systems and methods described herein are applied to data wrangling and/or environmental data relating to networks of electrical wires used to supply electrical power to consumers such as between above ground utility poles and/or underground nodes.

According to some further embodiments, utility poles themselves, rather than or in addition to the electrical wires can also be treated as a target asset. For example, utility poles can be treated as a target asset to wrangle data. In such cases, the techniques described herein can be applied to wrangle data pertaining to electric wires, and also to wrangle data pertaining to utility poles. Examples of utility pole data includes, for example, pole diameter, pole material, date of pole instillation, etc.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered as illustrative and not restrictive, and the body of work described herein is not to be limited to the details given herein, which may be modified within the scope and equivalents of the appended claims.

What it claimed is:

1. A method for improving pipe networks of underground pipes for carrying a fluid to consumers, the method comprising:
   receiving by a computer system a set of pipe data that includes a plurality of pipe attributes for one or more of said networks of underground pipes;
   identifying with the computer system one or more pipes in at least one of said networks for which one or more pipe attributes is incorrect;
   automatically generating imputed data for the one or more pipe attributes resulting in an improved set of pipe data;
   wherein said generating of imputed data comprises replacing said incorrect pipe attributes with correct attributes that include two or more of: pipe material, diameter, installation year, and surface area; and
   managing one or more aspects of one or more of said networks of underground pipes based on the improved set of pipe data, including:
      generating maintenance and replacement plans for said networks of underground pipes utilizing computer processing of environmental data in vector form and predicted likelihood of future failure of individual pipes;
      providing job planning; and
   replacing pipe sections accordingly.

2. A method according to claim 1 wherein the set of pipe data includes pipe break data at least some of which includes locations for pipe breaks but not specific pipe sections for said breaks, and said geolocation transfer process assigns pipe sections to at least some of said pipe breaks that are not the closest pipe sections to the respective locations for the pipe breaks.

3. A method according to claim 1 wherein said automatically generating imputed data includes using parcel data relating to a geographic position that corresponds to said one or more pipes.

4. A method according to claim 1 wherein said one or more pipe attributes is incorrect includes year of installation for a plurality of underground pipe sections, and said automatically generating imputed data includes correction and/or imputation of said incorrect installation years for at least some of the underground pipe sections.

5. A method according to claim 1 wherein said one or more pipe attributes is incorrect pipe material for a plurality of underground pipe sections, and said automatically generating imputed data includes correction and/or imputation of said incorrect pipe material for at least some of the underground pipe sections.

6. A method according to claim 1 wherein said one or more pipe attributes is incorrect pipe diameter for a plurality of underground pipe sections, and said automatically generating imputed data includes correction and/or imputation of said incorrect pipe diameter for at least some of the underground pipe sections.

7. A method according to claim 1 wherein said automatically generating imputed data includes uses machine learning to correct and/or impute for at least some of the incorrect pipe attributes.

8. A method according to claim 1 further comprising: predicting a likelihood of failure of a pipe section that has never leaked based on said improved set of pipe data.

9. A method according to claim 8 wherein said predicting is based at least in part on a model built with machine learning using at least some of said improved set of pipe data.

10. A method according to claim 8 wherein said managing includes planning pipe section replacement jobs based at least in part on said predicted likelihood of failure of said one or more pipe sections.

11. A system for improving pipe networks of underground pipes for carrying fluid to consumers, the system comprising:
a database that stores a set of pipe data that includes a plurality of pipe attributes for one or more of said networks of underground pipes;
a processing system configured to identify one or more pipes in at least on of said networks for which one or more pipe attributes is incorrect, generate imputed data for the two or more pipe attributes for pipe material, diameter, installation year, and surface area resulting in an improved set of pipe data, wherein one or more of aspects of one or more of said networks of underground pipes can be managed based at least in part on the improved set of pipe data;
wherein the processing system is further configured to predict likelihood of pipe segments in the said networks leaking, including of an individual pipe that has never leaked; and
said one or more of aspects of one or more of said networks of underground pipes being managed includes replacing pipe sections based at least in part on said predicted likelihood of leaking.

12. The system according to claim 11 further comprising a front end system that includes an uploader for receiving said set of pipe data from a customer who manages the one or more aspects of at least one of said networks of underground pipes, and a viewer that can display at least some of said improved set of pipe data which facilitates said management and wherein said processing system predicts the likelihood based at least in part on a model built with machine learning using at least some of said improved set of pipe data.

13. A method of improving networks of underground pipes, the method comprising:
accessing a first plurality of separate environmental raster form datasets;
merging at least some of the first plurality of separate environmental raster form datasets to generate a second plurality of larger environmental form datasets;
vectorizing at least some of second plurality of larger environmental form datasets to generate a third plurality of larger vector datasets;
merging at least some of the third plurality of larger vector datasets to form a merged vector dataset and imputing attributes of individual pipe segments that are incorrect in or missing from the separate environmental raster form databases, wherein the imputed attributes include pipe material and pipe diameter; and
replacing pipe sections based in part on said imputed missing attributes in the merged vector dataset;
wherein said replacing comprises selecting pipe sections for replacement based at least on predicting likelihood of failure of individual pipe segments, including of an individual pipe segment that has never leaked, and building a model using machine learning based at least in part on said standardized database, and wherein said predicting likelihood of individual pipe segments leaking is based on the model.

14. A method according to claim 13 wherein at least some of the first plurality of separate environmental raster datasets are not overlapping with each other or are not coextensive with each other.

15. A method according to claim 13 wherein separate environmental raster form datasets include one or more types of data selected from a group consisting of soil properties, population, climate, elevation, slope and soil.

16. A method according to claim 13 further comprising removing outlier data from said standardized database based on falling outside one or more predetermined limits.

17. A method according to claim 13 wherein said standardized database includes one or more new environmental variables that were not included in the first plurality of separate environmental raster form datasets.

18. A method according to claim 17 wherein the one or more new environmental variables include one or more selected from a group consisting of: soil density, population density, national slope, break density and proximity maps of shorelines, railways, subways, roads, rivers, creeks, streams, ponds and/or lakes.

19. A method according to claim 13 wherein said first plurality of separate environmental raster form datasets includes zoning data and the method further comprises categorizing a portion of said zoning data.

20. A method according to claim 13 further comprising approximating non-square-shaped data is to square-shaped data for more efficient integration into said database.

* * * * *